United States Patent
Berg et al.

(10) Patent No.: US 7,124,818 B2
(45) Date of Patent: Oct. 24, 2006

(54) CLAMP MECHANISM FOR IN-WELL SEISMIC STATION

(75) Inventors: Arne Berg, Kattem (NO); Sverre Knudsen, Trondheim (NO)

(73) Assignee: Weatherford/Lamb, Inc., Houston, TX (US)

( * ) Notice: Subject to any disclaimer, the term of this patent is extended or adjusted under 35 U.S.C. 154(b) by 231 days.

(21) Appl. No.: 10/678,963

(22) Filed: Oct. 3, 2003

(65) Prior Publication Data

US 2004/0114463 A1     Jun. 17, 2004

Related U.S. Application Data

(60) Provisional application No. 60/416,932, filed on Oct. 6, 2002.

(51) Int. Cl.
 *E21B 47/00* (2006.01)
 *G01V 1/00* (2006.01)

(52) U.S. Cl. .................... 166/250.01; 367/25

(58) Field of Classification Search ........... 166/250.01, 166/390; 367/25, 911
See application file for complete search history.

(56) References Cited

U.S. PATENT DOCUMENTS

| | | | |
|---|---|---|---|
| 4,715,440 A | 12/1987 | Boxell et al. | |
| 5,200,581 A | 4/1993 | Boyle et al. | |
| 5,962,819 A | 10/1999 | Paulsson | |
| 6,131,658 A * | 10/2000 | Minear | 166/250.01 |
| 6,181,642 B1 | 1/2001 | Coates et al. | |
| 2002/0097637 A1* | 7/2002 | Pearce et al. | 367/154 |
| 2003/0179651 A1* | 9/2003 | Nutt et al. | 367/25 |

FOREIGN PATENT DOCUMENTS

| | | |
|---|---|---|
| EP | 0 943 782 | 9/1999 |
| GB | 2311796 | 10/1997 |

OTHER PUBLICATIONS

Search Report, Application No. GB 0323329.3, dated Jan. 9, 2004.
Examination Report, Application No. GB 0323329.3, dated Jun. 17, 2005.

* cited by examiner

*Primary Examiner*—William Neuder
(74) *Attorney, Agent, or Firm*—Patterson & Sheridan, LLP

(57) ABSTRACT

A clamp mechanism for actively coupling an in-well seismic station to the casing of a well is disclosed. The clamp mechanism is capable of associating a sensor to production tubing for deployment in the well and is capable of actively coupling the sensor to the casing of the well. The clamp mechanism includes a body capable of being coupled to the deployment member. A carrier mechanism is attached to the sensor and positions adjacent the body. A release mechanism releases the carrier mechanism when subjected to a predetermined pressure in the well or when subjected to fluid in the well for a predetermined amount of time. A biasing mechanism is disposed between the body and the carrier mechanism and displaces the carrier mechanism with attached sensor towards the surface of the casing when released. A guiding mechanism guides the displacement of the carrier mechanism towards the surface of the casing.

52 Claims, 15 Drawing Sheets

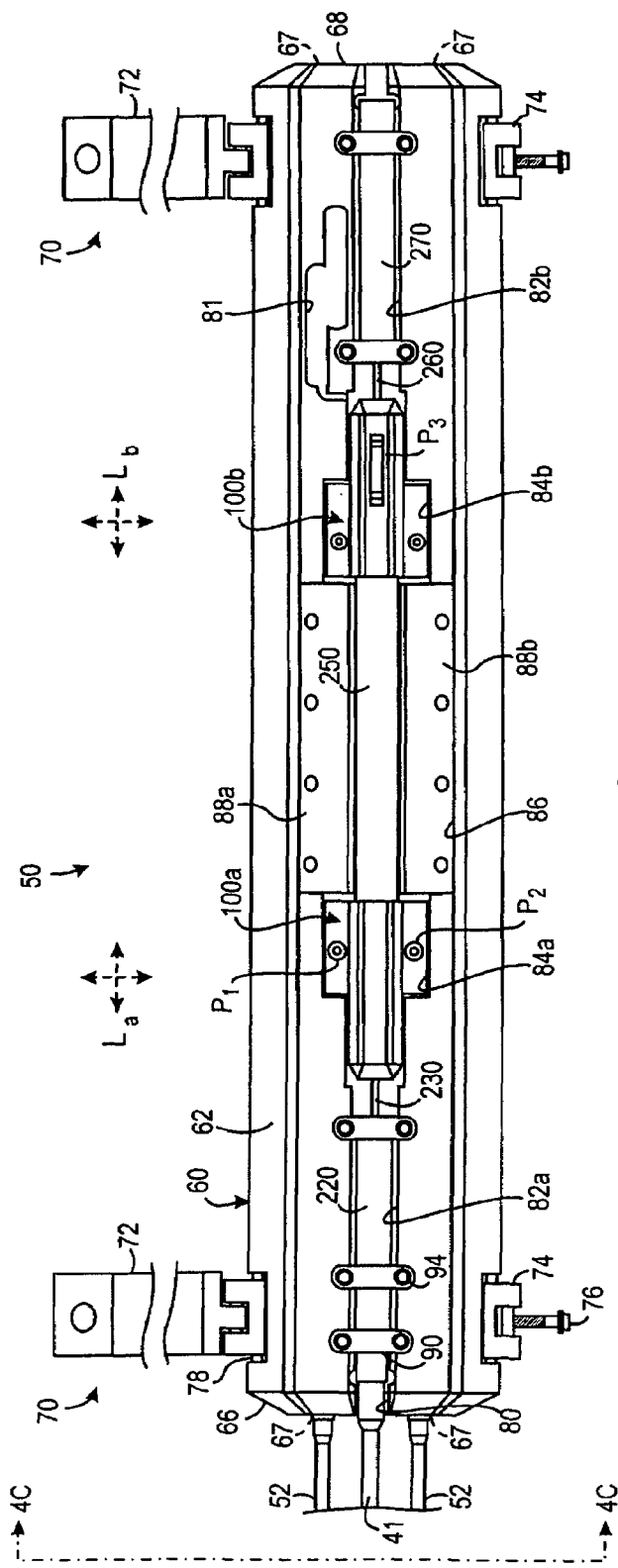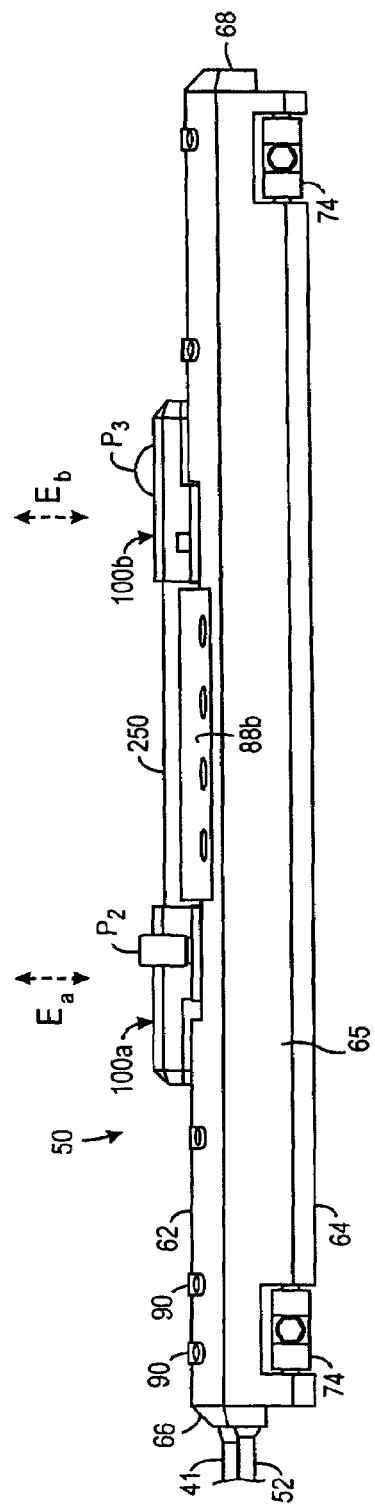
FIG. 4A
FIG. 4B

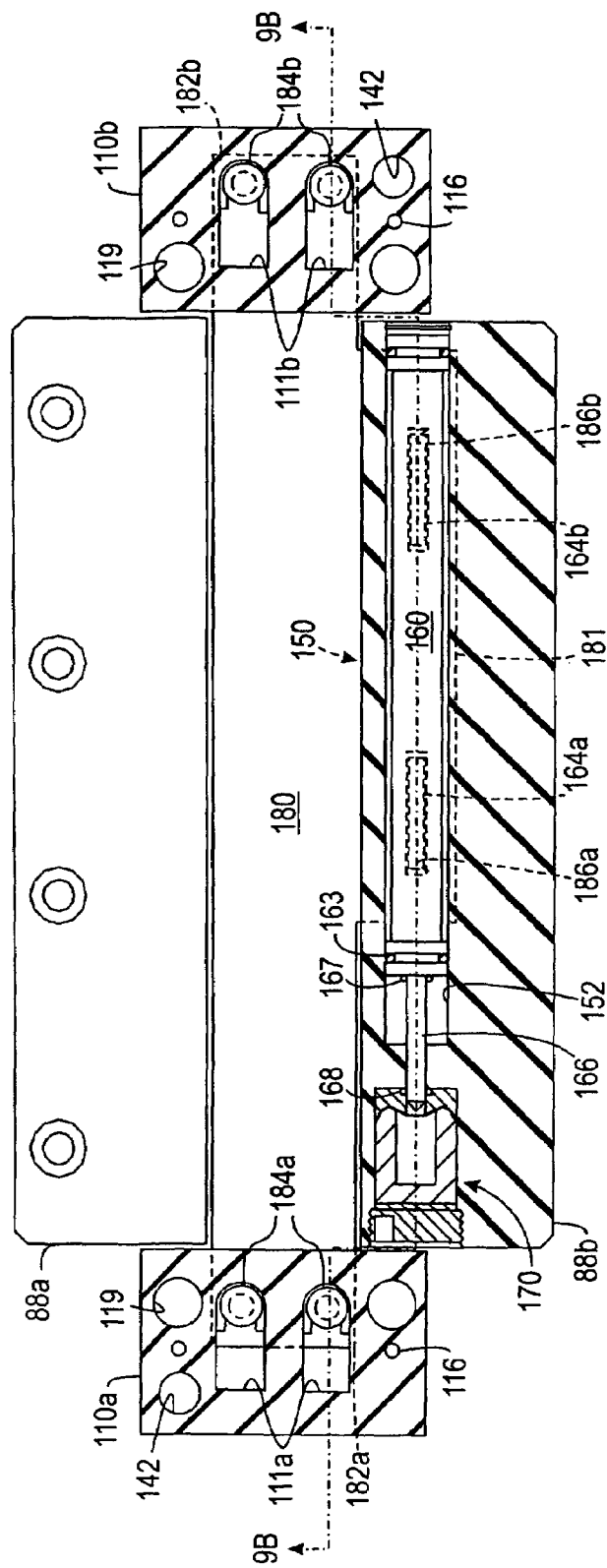
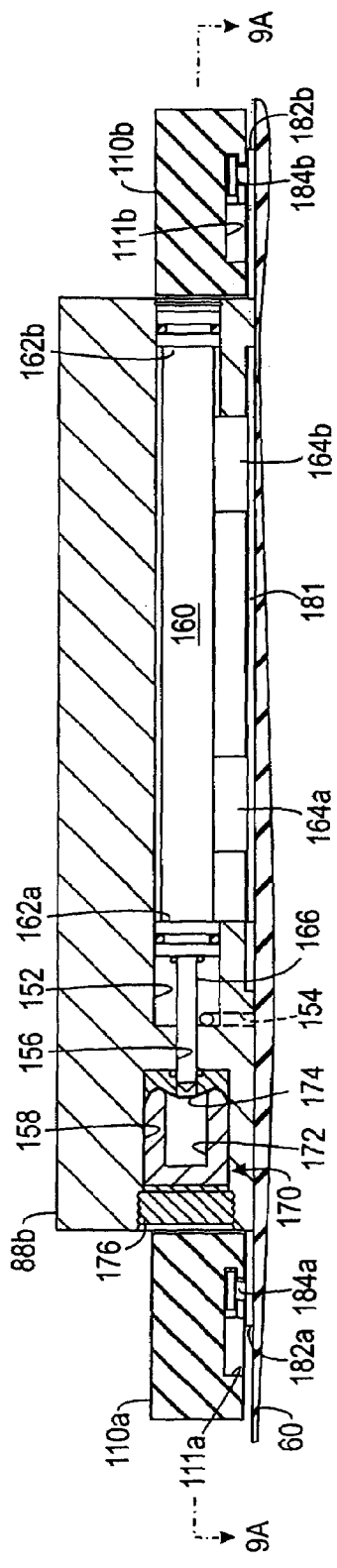
FIG. 9A
FIG. 9B

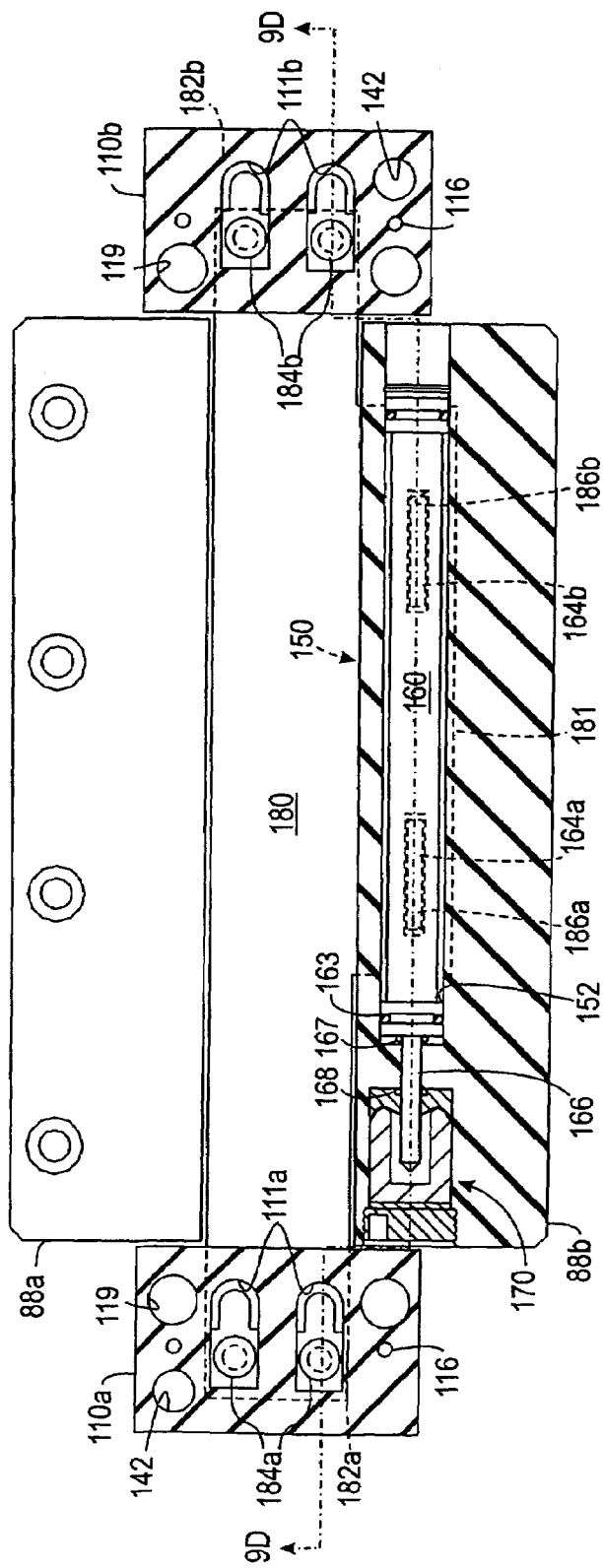
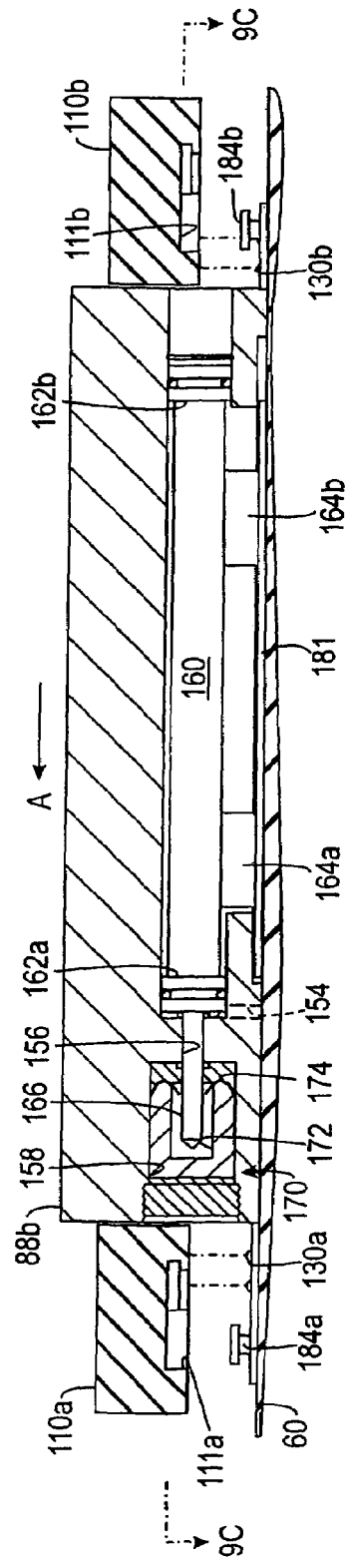
FIG. 9C
FIG. 9D

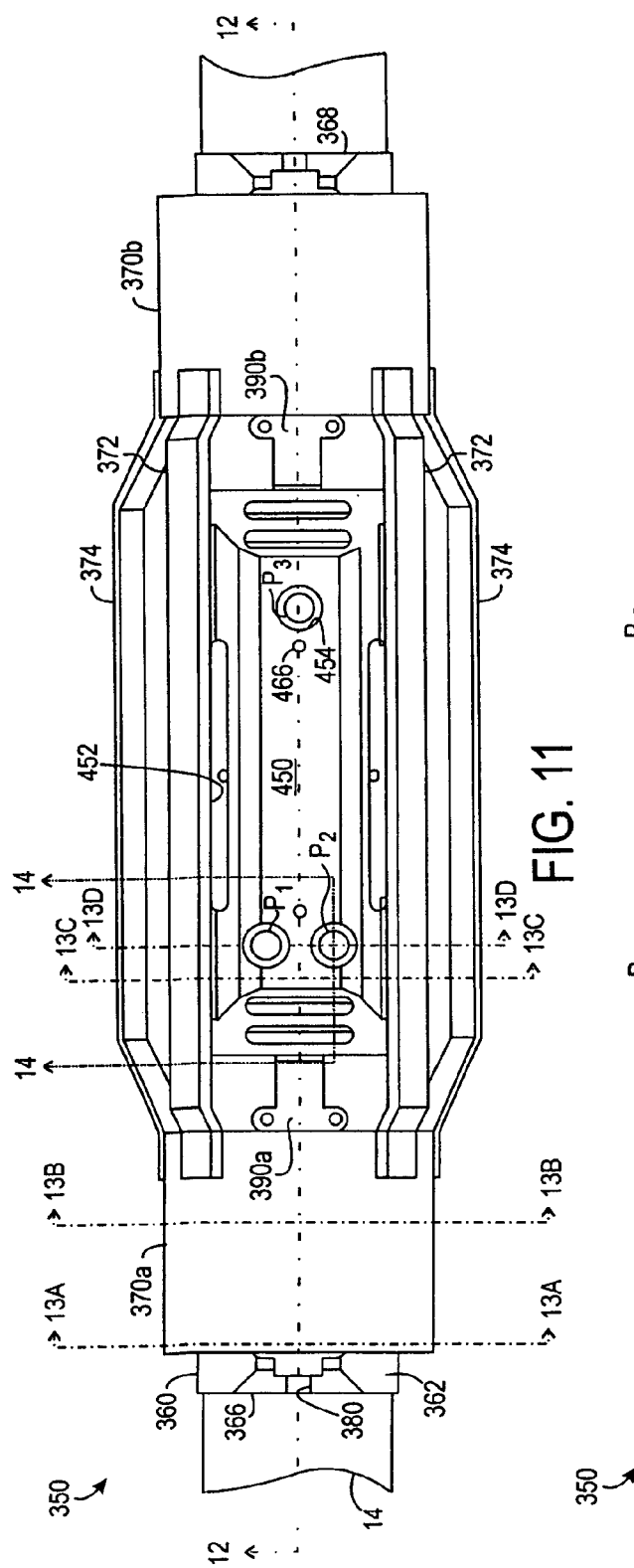

CLAMP MECHANISM FOR IN-WELL SEISMIC STATION

CROSS-REFERENCE TO RELATED APPLICATIONS

This application claims priority to U.S. provisional patent application Ser. No. 60/416,932, filed Oct. 6, 2002 and is related to co-pending U.S. patent application Ser. No. 10/266,903, filed Oct. 6, 2002 and co-pending U.S. patent application Ser. No. 10/266,715, filed Oct. 6, 2002. Each of the aforementioned related patent applications is herein incorporated by reference.

FIELD OF THE INVENTION

The present invention relates generally to a clamp mechanism for an in-well seismic sensor and, more particularly to a clamp mechanism for a fiber optic based sensor mechanism. The clamp mechanism is capable of coupling to production tubing for deployment in the well and is actively capable of acoustically coupling a sensor with the casing of the well. The clamp mechanism is capable of releasing the sensor mechanism towards the casing when subjected to a predetermined pressure within the well or when subjected to fluid in the well for a predetermined amount of time.

BACKGROUND OF THE INVENTION

Seismic surveying is a standard tool for the exploration of hydrocarbon reservoirs. Vertical seismic profiling (VSP) is one method employed in the art of seismic surveying. VSP can be used within a single well or can be used in multiple wells, i.e., in a cross-well arrangement, which are well known techniques. VSP uses a plurality of sensors arranged within the well. Various types of acoustic and/or pressure sensors known in the art are used in seismology. A seismic generator arranged at the surface or in another well transmits waves, which are reflected by the geologic formations or transmitted through them. The sensors then receive these waves.

It is generally preferred to permanently position the sensors within the well, and further preferred that such sensing not substantially interfere with normal production operation of the well. Various techniques exist in the art to mechanically couple sensors to a borehole structure, such as the production tube, the well casing, or a production packer. In the art, the sensors are typically arranged outside the casing and are surrounded by cement injected into the annular space between the casing and the borehole of the well. Embedding the sensors in this manner is beneficial in that acoustic waves used in the seismic analysis can easily travel to the sensors without attenuation. In addition, different types of acoustic waves (e.g., shear waves) can be sensed using this method. Unfortunately, mechanically coupling the sensors to the casing can be generally difficult and costly to perform. Furthermore, the sensors are not recoverable.

According to other approaches of vertical seismology in the art, sensors are only temporarily located within the well. During temporary placement, the sensors are used to take readings and then retrieved from the well. In addition, the position of the sensors can be changed within the well to take into account alterations of the earth strata under analysis, resulting from production of effluents. Moreover, deployment or retrieval of temporary sensors disrupts production from the well, which can be particularly costly if measurements are periodically made to assess strata conditions over a given time period. Furthermore, preparing the sensors for insertion into the well, properly positioning the sensors, and retrieving the sensors can require tedious preparation and execution.

The present invention is directed to overcoming, or at least reducing the effects of, one or more of the problems set forth above.

SUMMARY OF THE INVENTION

A clamp mechanism for actively coupling an in-well seismic sensor to the casing of a well is disclosed. The clamp mechanism is capable of coupling to the production tubing for deployment in the well and is capable of actively coupling the sensor to the casing of the well. The clamp mechanism includes a body capable of being coupled to the production tubing. The sensor is mounted in a carrier mechanism, which positions adjacent the body. A biasing mechanism is disposed between the body and the carrier mechanism. When released, the biasing mechanism is capable of displacing the carrier mechanism with the mounted sensor towards the surface of the casing. A release mechanism is capable of releasing the carrier mechanism when subjected to a predetermined pressure within the well or when subjected to fluid in the well for a predetermined amount of time. A guiding mechanism on the body and the carrier mechanism guides the displacement of the carrier mechanism towards the surface of the casing. Once coupled to the casing, the sensor is substantially acoustically decoupled from the clamp mechanism and production tubing.

BRIEF DESCRIPTION OF THE DRAWINGS

The foregoing summary, a preferred embodiment, and other aspects of the present invention will be best understood with reference to a detailed description of specific embodiments of the invention, which follows, when read in conjunction with the accompanying drawings, in which:

FIGS. 4A–C respectively illustrate a plan view, a side view, and an end view of an embodiment of an in-well seismic station having a clamp mechanism and a sensor mechanism according to the present invention.

FIGS. 9A–D illustrate various views of the clamp mechanism depicting an embodiment of a release mechanism according to the present invention.

FIG. 11 illustrates a plan view of another embodiment of a clamp mechanism according to the present invention.

FIG. 12 illustrates a side cross-section of the clamp mechanism of FIG. 11.

DETAILED DESCRIPTION OF THE INVENTION

In the interest of clarity, not all features of actual implementations of a clamp mechanism for actively coupling an in-well seismic station to the casing of a well are described in the disclosure that follows. It will of course be appreciated that in the development of any such actual implementation, as in any such project, numerous engineering and design decisions must be made to achieve the developers' specific goals, e.g., compliance with mechanical and business related constraints, which will vary from one implementation to another. While attention must necessarily be paid to proper engineering and design practices for the environment in question, it should be appreciated that the development of a clamp mechanism for actively coupling an in-well seismic station to the casing of a well would nevertheless be a routine undertaking for those of skill in the art given the details provided by this disclosure.

Figure 1:
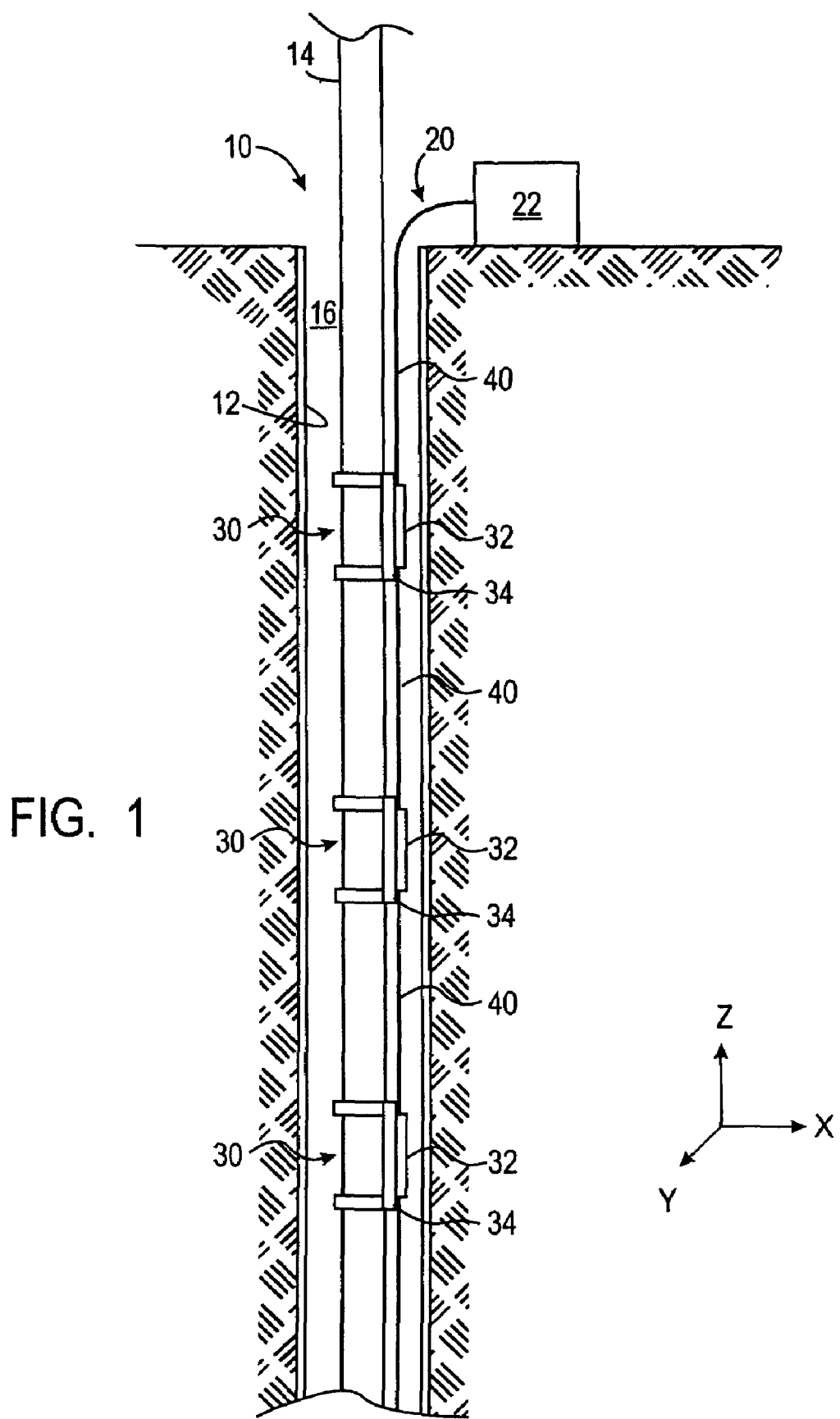
FIG. 1 schematically illustrates a seismic system according to the present invention deployed in a well having a casing.

Referring to the schematic illustration in FIG. 1, a fiber optic in-well seismic array 20 used in the exploration of a hydrocarbon reservoir is depicted. The array 20 has a plurality of seismic stations 30 interconnected by inter-station cables 40. The array 20 is shown deployed in a well 10, which has been drilled down to a subsurface production zone and is equipped for the production of petroleum effluents. Typically, the well 10 includes a casing 12 coupled to the surrounding formations by injected cement. Production tubing 14 is lowered into the cased well 10. The well 10 can be fifteen to twenty thousand feet or more in depth, and the annulus 16 can be filled with a drilling fluid (not shown) having a high temperature and pressure, which presents an extremely corrosive and hostile environment.

The seismic stations 30 include sensor mechanisms 32 and clamp mechanisms 34. The sensor mechanisms 32 are interconnected by the inter-station cables 40 to a source/sensing/data collection apparatus 22, which typically includes a demodulator and optical signal processing equipment (not shown). The inter-station cables 40 are typically ⅜-inch diameter cables housing optical fibers between the sensor mechanisms 32 and the apparatus 22.

The sensor mechanisms 32 include one or more sensors (not shown), among other components disclosed in more detail below. The clamp mechanisms 34 couple the sensor mechanisms 32 to the production tubing 14, which is then lowered to a desired depth in the well 10. A preferred system and method for transporting, deploying, and retrieving the sensor mechanism 32 and the clamp mechanism 34 of the present invention is disclosed in U.S. patent application Ser. No. 10/266,715, filed Oct. 6, 2002 and is incorporated herein by reference in its entirety. Once deployed in the well 10, the sensors of the sensor mechanisms 32 are actively coupled to the casing 12 using the clamp mechanisms 34 of the present invention.

As is known in the art, seismology involves the detection of acoustic waves to determine the strata of geologic features, and hence the probable location of petroleum effluents. A seismic generator (not shown) arranged at the surface or in another well is used to generate acoustic waves. Acoustic waves radiate from the source along direct paths and reflected paths through the various layers of earth. The seismic waves cause the surrounding earth layers to react, and the motion is detected by the sensors in the sensor mechanisms 32 through the casing 12 coupled to the earth. Resulting signals are transmitted through the inter-station cable 40 to the source/sensing/data collection apparatus 22, which interrogates the sensor mechanisms 32.

As is known in the art of fiber optic based seismic sensing, each sensor mechanism 32 can include one or more fiber optic based sensors, such as fiber Bragg gratings (FBG5), that reflect a narrow wavelength band of light having a central wavelength. If each sensor has a different reflection wavelength, the reflected signals may be easily detected using Wavelength Division Multiplexing (WDM) techniques. If the sensors have the same wavelength, reflected signals can be resolved in time using Time Division Multiplexing (TDM) techniques. Such multiplexing technologies and mixtures thereof are well known in the art. For brevity, well-known additional steps, devices, and techniques employed in the methods of seismic sensing are omitted.

When performing vertical seismic profiling, the seismic stations 30 of the array 20 are distributed over a known length, for example, 5000 feet. Over the known length, the seismic stations 30 can be evenly spaced at desired intervals, such as every 10 to 20 feet, for providing a desired resolution. Accordingly, the fiber optic in-well seismic array 20 can include hundreds of sensor mechanisms 32 and associated clamp mechanisms 34. Because fiber optic connectors (not shown) on the inter-station cables 40 between the sensor mechanisms 32 can generate signal loss and back reflection of the signal, the use of such connectors is preferably minimized or eliminated in the array 20. The practical consequence of limiting the use of fiber optic connectors is that all or most of the sensor mechanisms 32 must be spliced with the inter-station cables 40 before being transported to the well 10.

The clamp mechanism 34 of the present invention facilitates the pre-assembly, deployment, and retrieval of the array 20. The clamp mechanism 34 is capable of coupling to the tubing 14 and is capable of actively coupling the sensors of the sensor mechanism 32 to the inner wall of the casing 12. As will be evident herein, the clamp mechanism 34 reduces or eliminates problems set forth above. Namely, use of the clamp mechanism 34 may not significantly disrupt production from the well. Furthermore, preparing the clamp mechanisms 34 for insertion into the well 10, properly coupling the sensor mechanisms 32 to the casing 12, and retrieving the sensors and clamp mechanisms 32 and 34 may not require tedious preparation and execution.

Figure 2:
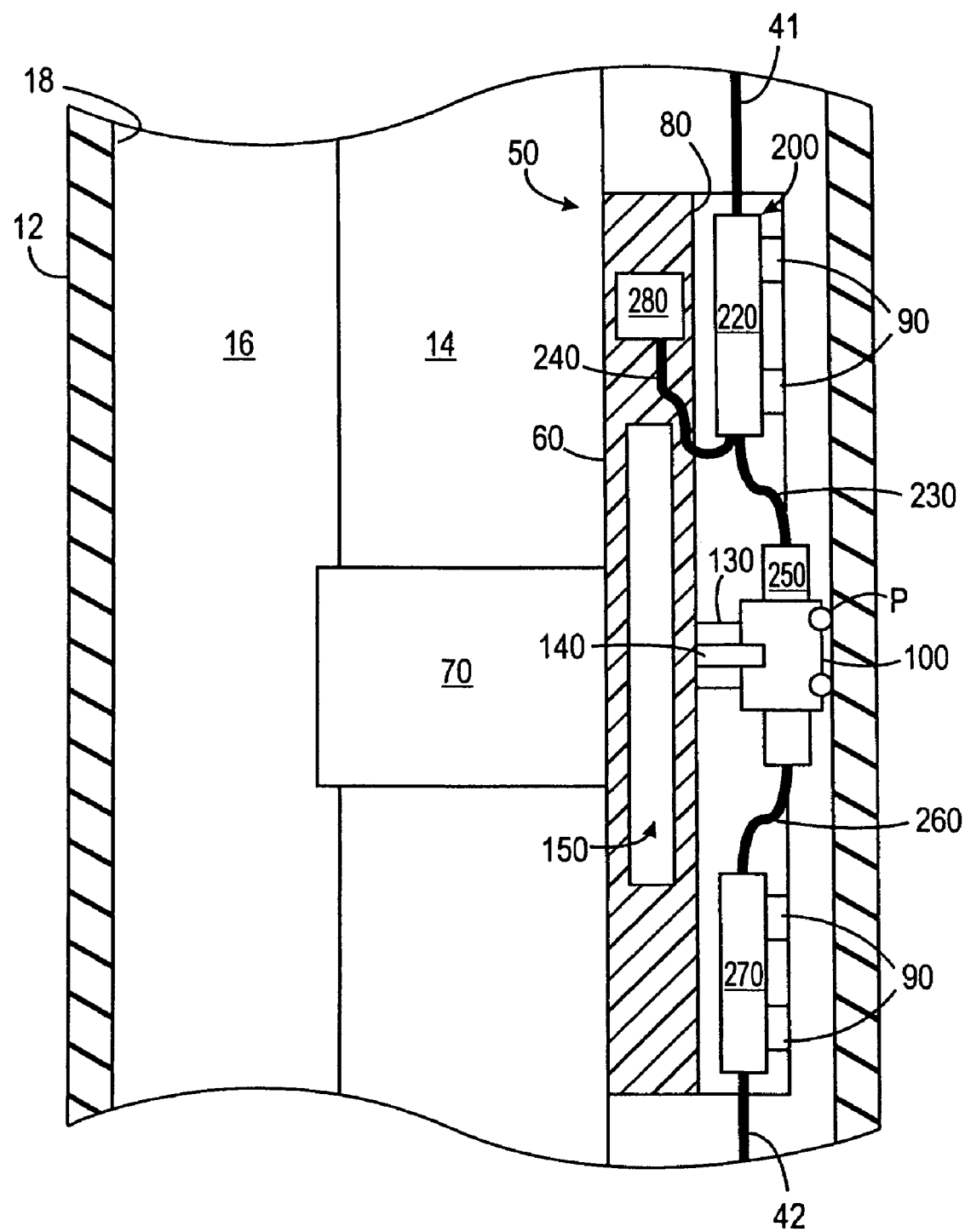
FIG. 2 schematically illustrates a seismic station having a clamp mechanism and a sensor mechanism of the present invention in an annulus formed between a casing and a production tube in a well.
Figure 3:
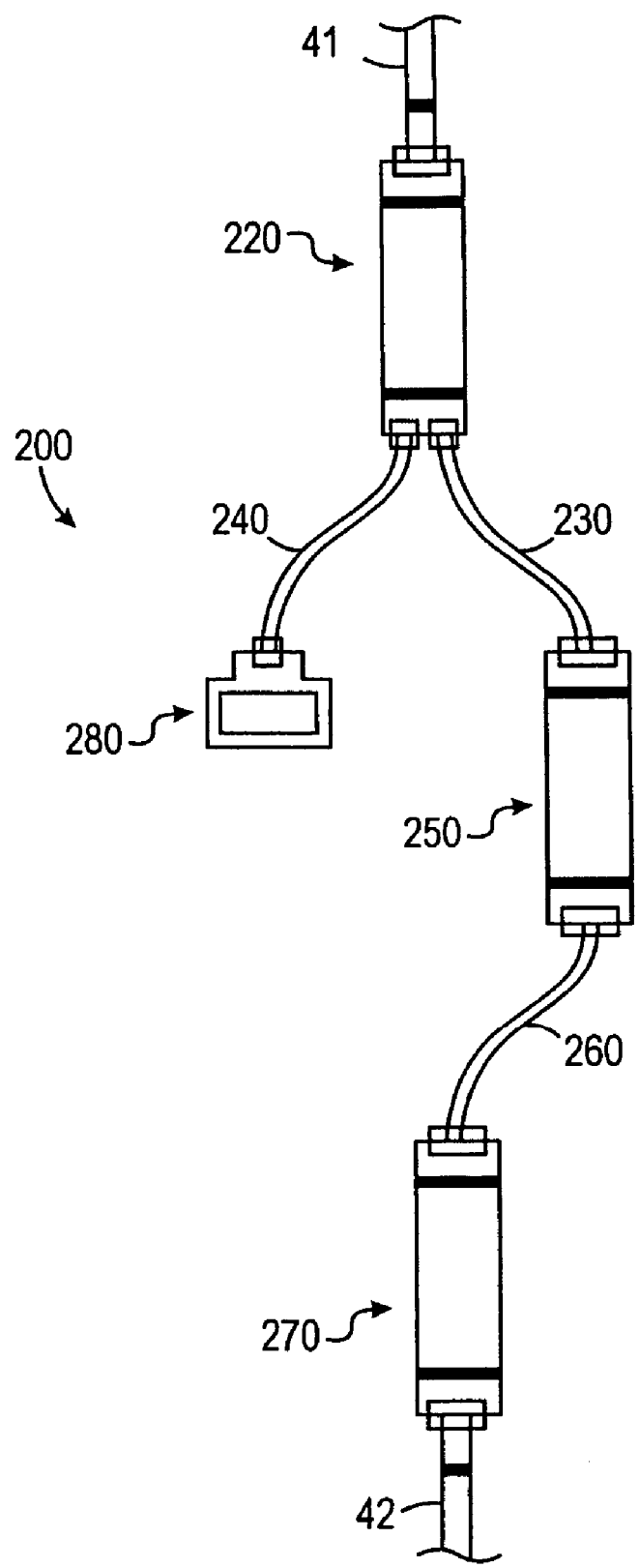
FIG. 3 schematically illustrates an embodiment of the sensor mechanism for use with the clamp mechanism of the present invention.

Referring to FIGS. 2–3, a clamp mechanism 50 and a sensor mechanism 200 according to the present invention are schematically illustrated. As shown in FIG. 2, the clamp mechanism 50 includes a body 60, an attachment device 70, mounting members 90, and a carrier mechanism 100. The clamp mechanism 50 also includes a biasing mechanism 130, a guiding mechanism 140, and a release mechanism 150.

The attachment device 70 couples the body 60 of the clamp mechanism 50 to a deployment member 14, such as production tubing. When lowered into the well 10, the clamp mechanism 50 is disposed in an annulus 16 between the production tubing 14 and a casing 12 of the well. The body 60 defines a channel 80 for holding the sensor mechanism 200. Many different types of sensors can be used in conjunction with the disclosed clamping mechanism 50. For example, the sensor mechanism 200 can constitute an electrically based or fiber optic based sensor. In a preferred embodiment, the sensor mechanism 200 includes one or more fiber optic based sensors. A preferred sensor mechanism for use with the present invention is disclosed in U.S. patent application Ser. No. 10/266,903, filed Oct. 6, 2002 and is incorporated herein by reference in its entirety.

In FIG. 3, the preferred sensor mechanism 200 for use with the clamp mechanism of the present invention is schematically illustrated in an isolated view. The sensor mechanism 200 includes a first splice component 220, a sensor component 250, and a second splice component 270. A first intra-station cable 230 connects the first splice component 220 with the sensor component 250, and a second intra-station cable 260 connects the sensor component 250 with the second splice component 270. The sensor mechanism 200 can also include another sensor component 280 connected to the first splice component 220 with a third intra-station cable 240.

First and second inter-station cables 41 and 42 can be connected at both ends of the sensor mechanism 200. Such a dual-ended sensor mechanism 200 allows several sensors mechanisms to be multiplexed in series or allows the sensor mechanism 200 to be multiplexed with other fiber optic measuring devices, such as pressure sensors, temperature sensors, flow rate sensors or meters, speed of sound or phase fraction sensors or meters, or other like devices. Examples of other sensing devices are disclosed in the following U.S. patent applications, which are hereby incorporated by reference in their entireties: Ser. No. 10/115,727, filed Apr. 3, 2002, entitled "Flow Rate Measurement Using Short Scale Length Pressures"; Ser. No. 09/344,094, filed Jun. 25, 1999, entitled "Fluid Parameter Measurement In Pipes Using Acoustic Pressures"; Ser. No. 09/519,785, filed Mar. 7, 2000, entitled "Distributed Sound Speed Measurements For Multiphase Flow Measurement"; Ser. No. 10/010,183, filed Nov. 7, 2001, entitled "Fluid Density Measurement In Pipes Using Acoustic Pressures"; and Ser. No. 09/740,760, filed Nov. 29, 2000, entitled "Apparatus For Sensing Fluid In a Pipe".

If only one sensor mechanism 200 is used or if the sensor mechanism 200 is the last in an array of sensor mechanisms, the second intra-station cable 260, the second splice component 270, and the inter-station cable 42 need not be connected to the end of the sensor component 250. Ultimately, the inter-station cable 41 connects to a source/sensing/data collection apparatus (not shown), which is well known in the art and is capable of interrogating the sensors in the mechanism 200 and interpreting data retrieved therefrom.

The first splice component 220 houses a fiber organizer, splices, and other devices (not shown) for optical fiber delivered from the inter-station cable 41. For example, excess fiber from the cable 41 can be wound on a fiber organizer within the splice component 220. The first intra-station cable 230 carries optical fiber from the first splice component 220 to the sensor component 250. The sensor component 250 houses one or more sensors (not shown). Many different types of sensor may be used in conjunction with the disclosed sensor mechanism 200. In a preferred embodiment for in-well seismic sensing, the sensor mechanism 200 preferably houses one or more accelerometers, such as disclosed in U.S. patent application Ser. No. 09/410,634, filed Oct. 1, 1999 and entitled "Highly Sensitive Accelerometer," and Ser. No. 10/068,266, filed Feb. 6, 2002 and entitled "Highly Sensitive Cross Axis Accelerometer," which are incorporated herein by reference in their entirety. The accelerometers (not shown) can be arranged to measure acceleration from acoustic waves in any of three orthogonal axes (x, y, and z) and can transmit respective sensing light signals indicative of static and dynamic forces at their location on the optical fiber.

The second intra-station cable 260 carries optical fiber from the sensor component 250 to the second splice component 270. The second splice component 270 is substantially similar to the first splice component 220 and houses a fiber organizer, splices, and other devices (not shown) for optical fiber. As noted above, the second interstation cable 42 can be connected to another sensor mechanism 200 of the array. Otherwise, the second splice component 270 can have a terminated end or can be eliminated altogether. The third intra-station cable 240 can carry optical fiber from the first splice component 220 to the second sensor component 280, which can be a fiber optic based hydrophone, for example, of which several are well known.

The components 220, 250, and 270 of the sensor mechanism 200 preferably have cylindrical housings, allowing the sensor mechanism 200 to have a small profile for use in the clamp mechanism 50 of the present invention. In FIGS. 2–3, the sensor mechanism 200 is depicted in a basic form to show the gross details of the present invention Relevant detail of the components, materials, and methods of manufacture for the sensor mechanism 200 can be obtained from U.S. patent application Ser. No. 10/266,903, filed Oct. 6, 2002 and has been incorporated herein by reference in its entirety.

Although the present embodiment of the clamp mechanism 50 is used with the multiple component sensor mechanism 200 having cylindrical housings, one skilled in the art will appreciate that the clamp mechanism 50 can be used with other sensor mechanisms having other configurations. Accordingly, the channel 80 defined in the clamp mechanism 50 of FIG. 2 can have rectilinear or other shapes. Furthermore, it is understood that the sensor mechanism 200 preferably has temperature, pressure, shock, and random vibration ratings suitable for deployment in a well. Consequently, the sensor mechanism 200 incorporated herein is suitable.

As shown in FIG. 2, the first and second splice components 220 and 270 are mounted in the channel 80 of the body 60 with the plurality of mounting members 90. The sensor component 250 is mounted within the carrier mechanism 100. The carrier mechanism 100 with the sensor component 250 mounted therein is biased towards the casing 12 with biasing mechanism 130 and is guided towards the casing 12 with the guiding mechanism 140. The guiding mechanism 140 guides the carrier mechanism 100 substantially perpendicular to the axis of the tubing 14. In addition, the guiding mechanism 140 preferably allows the carrier mechanism 100 to shift longitudinally and laterally along a plane being substantially parallel to the axis of the tubing 14.

When deployed in the well, the release mechanism 150 holds the carrier mechanism 100 adjacent the body 60 until released. After installation in the well 10, the release mechanism 150 is actuated to release the carrier mechanism 100 with mounted sensor component 250. The biasing mechanism 130 pushes the carrier mechanism 100 towards the casing 12, and the guiding mechanism 140 guides the carrier mechanism 100 towards the casing 12. Preferably, the carrier mechanism 100 establishes acoustical contact with the surface 18 at a plurality of points P. The intra-station cables 230 and 260 are flexible and allow the sensor component 250 to be moved in relation to the splice components 220 and 270 connected thereto. When the carrier mechanism 100 establishes acoustical contact with the surface 18, the sensor component 250 is acoustically coupled to the casing for seismic sensing.

The release mechanism 150 can be activated by telemetry, electrical signal, pressure differential, a rupture disc, or other method. Due to daily rig costs and risks inherent in coiled-tubing and wire-line intervention of electrically activated release, the release mechanism 150 is preferably activated without intervention. One method for interventionless activation of the release mechanism 150 involve the use of pressure pulses to actuate the release mechanism 150. For example, pressure pulses can be transmitted down the fluid column of the annulus 16 from a surface unit (not shown). An electronic module (not shown) of the release mechanism 150 can detect the pressure pulses. When a pre-programmed pattern of pulses is detected, the release mechanism 150 is actuated and is set by hydrostatic pressure of the well to release the carrier mechanism 100.

A preferred method for interventionless activation of the release mechanism 150 uses the absolute pressure of the well to effectuate release of the carrier mechanism 100 with the mounted sensor component 250. As best described below with reference to FIGS. 9A–D, the release mechanism 150 in a preferred embodiment includes a rupture disc, which eliminates the need for a separate hydraulic, electrical, or telemetry system to activate the mechanism 150.

Another preferred method for interventionless activation of the release mechanism 150 uses the fluid in the well. As best described below with reference to FIGS. 14A–15D, the release mechanism 150 in another preferred embodiment includes a member composed of dissolvable polymer to hold the carrier mechanism 100 until a predetermined amount of exposure to fluid in the well.

Once released, the sensor component 250 is not substantially mechanically coupled to the body 60 of the clamp mechanism 50, as will be evident in the disclosure that follows, and hence is substantially acoustically decoupled from the body 60 once released. The carrier mechanism 100 with mounted sensor component 250 is substantially free-moving relative to the body 60, is guided towards the casing 12, and is biased to acoustically couple to the casing 12.

With the benefit of the above description of the clamp mechanism 50 and sensor mechanism 200 of the present invention, additional components, features, and aspects of the clamp mechanisms 50 will now be discussed in more detail.

Figure 4C:
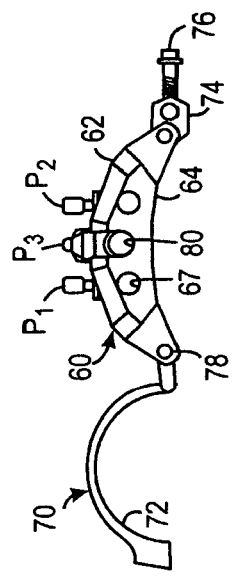
Figure 5:
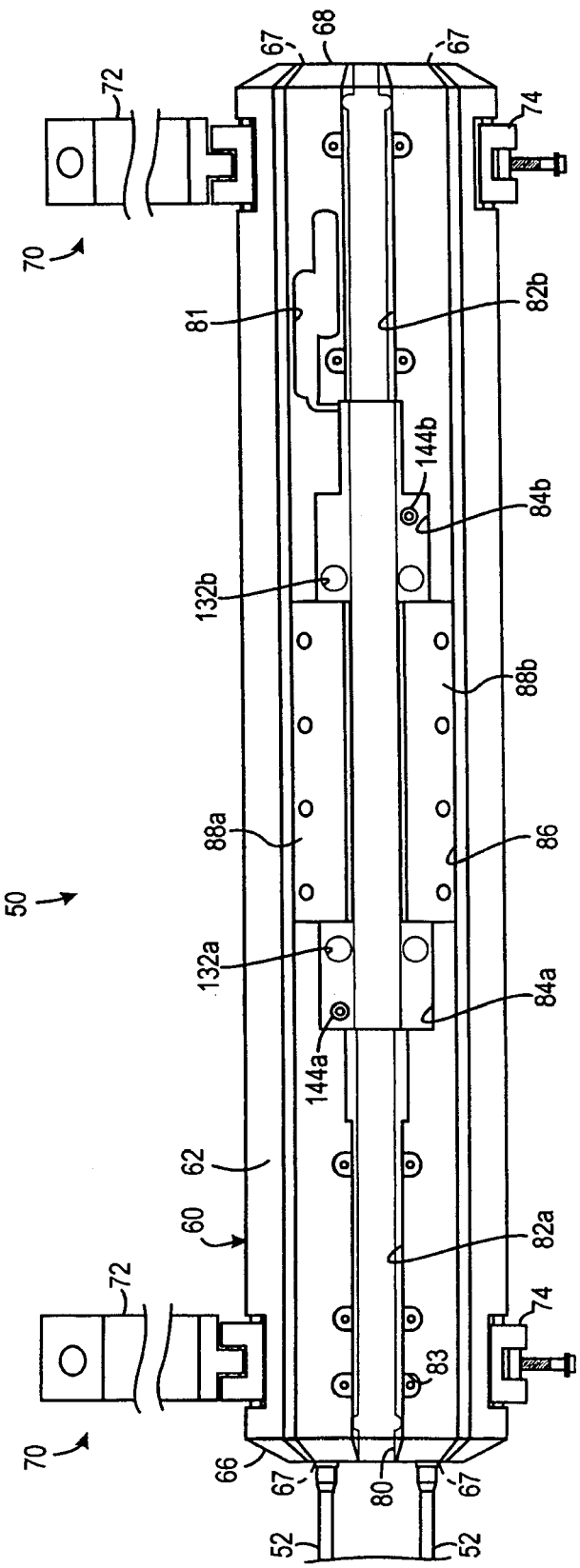
FIG. 5 illustrates a plan view of the body of the clamp mechanism of FIGS. 4A–C.
Figure 6:
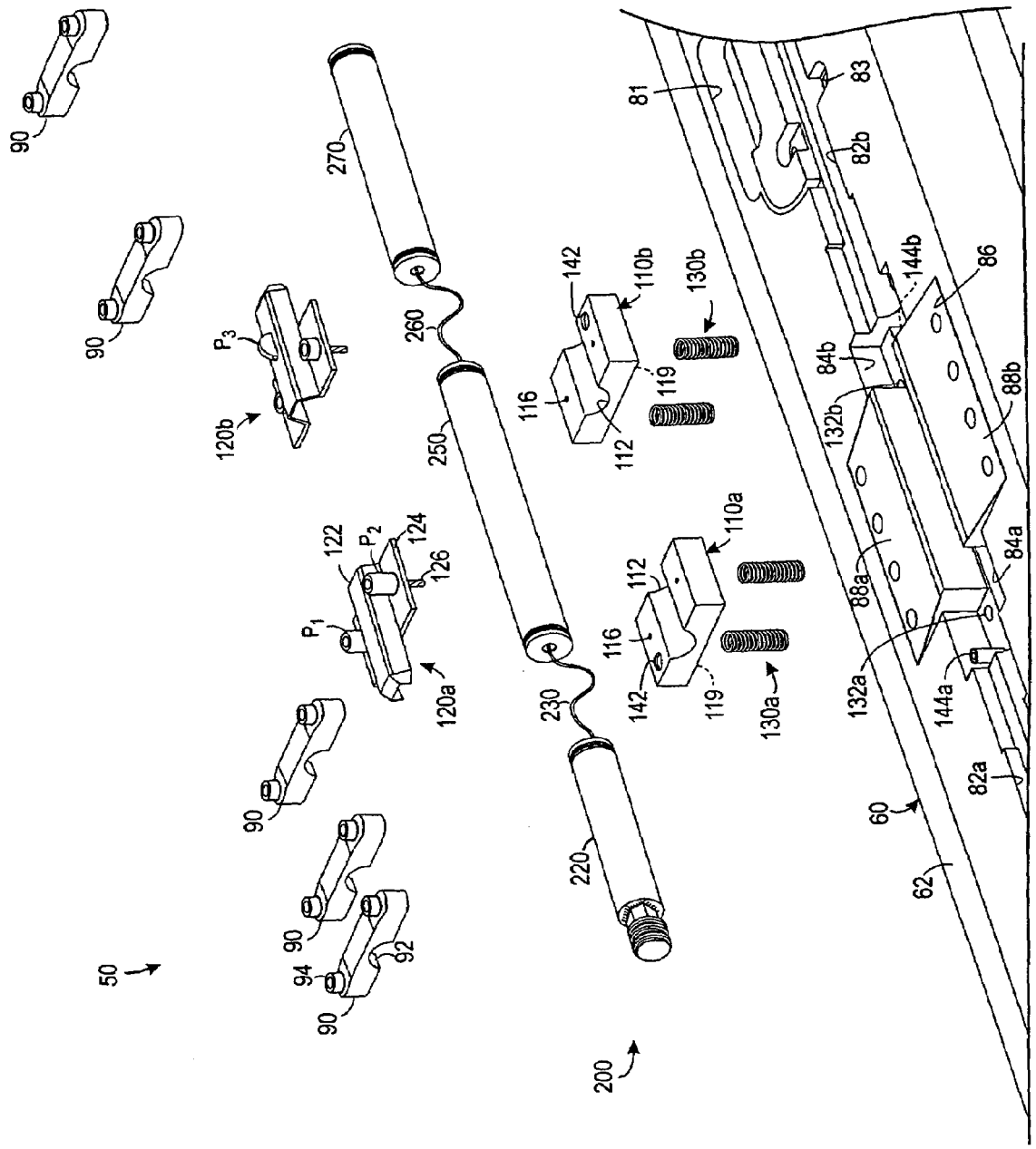
FIG. 6 illustrates an exploded view of the clamp mechanism and the sensor mechanism of FIGS. 4A–C.

Referring to FIGS. 4A–7, an embodiment of an in-well seismic station having a clamp mechanism 50 and a sensor mechanism 200 according to the present invention is illustrated in a number of views. In FIGS. 4A–C, the clamp mechanism 50 and the sensor mechanism 200 are shown in a plan view, a side view, and an end view, respectively. In FIG. 5, the body 60 of the clamp mechanism 50 of the present invention is shown in a plan view. In FIG. 6, the clamp mechanism 50 and the sensor mechanism 200 are shown in an exploded view.

As best shown in FIGS. 4A–C, the clamp mechanism 50 includes the body 60, attachment devices 70, a plurality of brackets 90, carrier mechanisms; 100a–b, and biasing mechanisms 130a–b. The body 60 has first and second sides 62 and 64 and first and second ends 66 and 68. The body 60 is approximately 70 to 100-cm in length and is capable of fitting in the aimulus formed between 5, 5.5, and 7-inch production tubing positioned inside 9⅝-inch casing. One of ordinary skill in the art will appreciate that the dimensions provided above are only exemplary and can be changed depending on the sizes of casing, tubing, and sensors for the intended application of the present invention.

As best shown in the end view of FIG. 4C, the first side 62 of the body 60 defines a curvilinear shape. The first side 62 is intended to position adjacent the casing (not shown) of the well, as described below. The shape of the side 62 enables the body 60 to fit the various casing dimensions. A similar shape can be used for the second side 64 to accept various dimensions and tolerances of tubing (not shown) to be encountered. Physical contact between the second side 64 and the tubing is preferably close to the outer edges 65 adjacent where the attachment devices 70a–b are connected to the body 60. The shape of the first and second sides 62 and 64 thus accommodate the cylindrical surfaces of the tubing and casing to be encountered and minimize the obstruction of the annulus formed between them. It is understood that other variations in the topology of the body 60 are possible to allow for fluid in the annulus to flow around the body 60. The body 60 can define a groove (not shown) in the second side 64 adjacent the tubing. In this way, a cable can be disposed along the groove between the body 60 and the tubing, which allows the clamp mechanism 50 to also be used as an ordinary cable clamp for other in-well systems.

As evidenced herein, the clamp mechanism 50 of the present invention has a low profile, allowing the clamp mechanism 50 to be associated to production tubing. In the art of seismic sensing, seismic sensors are typically installed in the well using conventional wire line. By using the low profile clamp mechanism 50, the sensor mechanism 200 can be coupled to the tubing and installed in the well with the production tubing. Thus, the clamp mechanism 50 can be used for seismic sensing during production so that operations are not greatly affected. In addition, the clamp mechanism 50 and sensor mechanism 200 can be retrieved for reuse.

The body 60 can be formed by casting, machining, or a number of techniques or combinations thereof known in the art. Using a combination of flat surfaces angled from one another to form the curvilinear shape for the first and second sides 62 and 64 can be easily machined, which is an advantage for manufacturing. The body 60 is preferably made from austinitic stainless steel with reference AISI 316, which is suitable for casting and has sufficient strength and resistance to high temperature and corrosion for use in conditions of a well. Using this material and the dimensions set forth above, the body 60 can weigh about 20–40-kg. However, other materials, metals, or alloys can be used depending on the desired strength of the body 60 and its expected environment (i.e., the annulus of a well). The materials of the body 60 and other components of the clamp mechanism 50 can be modified depending on the intended environment, which can vary from well to well in terms of pressure, temperature, and caustic chemicals. For example, the materials of the clamp mechanism 50 may need to be modified if sufficient amounts of hydrogen sulfide or "sour gas" are present in the well. As is known in the art, the presence of hydrogen sulfide having a concentration as low as 10-ppm can weaken metals by causing sulfide stress cracking. Metallurgical techniques and materials resistant to such sour gas are well known to those of ordinary skill in the art.

As mentioned previously, the body 60 couples to the production tubing (not shown) with the attachment devices 70. The attachment devices 70 can include components commonly used with ordinary cable clamps. The attachment devices 70 each include a clamping component 72 and a coupling component 74. The clamping components 72 are hingedly connected to the body 60 for encompassing the tubing, while the coupling components 74 are hingedly connected to the other edge of the body 60 for connecting to an end of the clamping component 72 using a bolt 76. Pivot pins 78 are used for the hinged connections of the components 72 and 74 to the body 60. The pivot pins 78 allow the components 72 and 74 to move laterally thereon, which accommodates the effects of thermal expansion and deformation of the tubing and body 60 when in the well.

In addition to the use of the attachment devices 70 to couple the clamp mechanism 50 to the tubing, the body 60 preferably includes a plurality of support rods 52 in one or both of the ends 66 or 68 of the body 60. The support rods 52 are threaded into holes 67 and extend from the ends 66 or 68 of the body 60. As best described below and shown in FIGS. 10A–B, the distal ends of the support rods 52 have stops and are held within standard anchor clamps coupled to the production tubing. The rods 52 are movable in the anchor clamps to allow for shifting and adjustment due to the effects of temperature and deformation in the well.

The body 60 protects of the sensor mechanism 200 during installation and retrieval. Accordingly, the first side 62 defines a channel 80. As best shown in FIG. 5, which shows the body 60 without the sensor mechanism placed therein, the channel includes end recesses 82a–b, intermediate recesses 84a–b, and a central recess 86. The channel 80 can also include an auxiliary recess 81 for an auxiliary sensor component (not shown), such as a hydrophone.

As best shown in FIG. 4A, the end recesses 82a–b respectively communicate with the ends 66 and 68 of the body 60 and house the splice components 220 and 270. The intermediate recesses 84a–b respectively connect the end recesses 82a–b with the central recess 50. The intermediate recesses 84a–b primarily house the intra-station cables 230 and 260, the carrier mechanisms 100a–b, and the biasing mechanisms 130a–b, which are best shown in FIG. 6.

As best shown in the plan view of FIG. 5, each of the intermediate recesses 84a–b includes a guide pin 144a–b. The guide pins 144a–b are disposed in opposite corners of the recesses 84a–b. In addition, the recesses 84a–b each define indentations 132a–b for the biasing mechanisms 130a–b described below. As best shown in FIG. 4A, the central recess 86 houses a major portion of the sensor component 250. In the present embodiment, the central recess 86 is substantially wider than the sensor mechanism 250, and ancillary side members 88a–b are disposed in the central recess 86 along the sides of the sensor mechanism 250. The side members 88a–b are attached to the body 60 with bolts and can be removed so that the clamp mechanism 50 can be used with other devices or for applications other than fiber optic in-well seismic sensing explicitly disclosed herein. One of the side members 88a–b also preferably holds components of a release mechanism (not shown). Relevant details of an embodiment of a release mechanism according to the present invention are provided below with reference to FIGS. 9A–D.

The splice components 220 and 270 can be held firmly within the end recesses 82a–b by several methods or structures known in the art. As best shown in FIGS. 4A–B, a plurality of mounting members 90 hold the splice components 220 and 270 in the recesses 82a–b. As best shown in FIG. 6, the mounting members 90 each define a cylindrical surface 92 to match the cylindrical housings of the splice components 220 and 270. Fasteners 94 on each mounting member 90 connect the member to countersinks 83 formed in the first side 62 of the body 60. The fasteners 94 are preferably held within the mounting members 90 so they cannot be separated therefrom, which eases assembly.

When attached in the countersinks 83, the mounting members 90 are preferably flush with the first side 62 of the body 60, as best shown in the side view of FIG. 4B. Because the first splice component 220 has the inter-station cable 41 connected thereto, the splice component 220 must be able to withstand any forces that may be imposed on it during assembly, transport, or operation. Therefore, the first splice component 220 preferably has three mounting members 90a–c holding the component 220 in the end recess 82a. The second splice component 270 has two mounting members 90d–e.

In an alternative embodiment, the plurality of mounting members 90 can be hingedly connected to the body 60 at one end and can fasten to the body 60 at the other end. In yet another alternative, a single mounting member can be used for each splice housing 220 and 270. If a single mounting member is used for each splice component 220 or 270, the single mounting member, such as a curved plate, can be made to span substantially the entire length of the splice component 220 or 270 to provide a substantial amount of protection and a flush outer surface to the body 60. As one of ordinary skill in the art will recognize, a number of techniques and methods known in the art can be used to mount the splice components 220 and 270 to the body 60.

The carrier mechanisms 100a–b hold the sensor component 250. As best shown in FIG. 6, the carrier mechanisms 100a–b each include a support 110a–b connecting to a bracket 120a–b, which clamp around respective ends of the sensor component 250. Each of the supports 110a–b defines a cylindrical surface 112 to match the cylindrical housing of the sensor component 250. Each of the supports 110a–b also defines threaded holes 116, a guide hole 142, and bored holes 119. The threaded holes 116 mate with fasteners 126 to connect the supports 110a–b with the brackets 120a–b. The guide holes 142 mate with one of the guide pins 144a–b in the intermediate recesses 84a–b. The bored holes 119 are on the underside of the supports 110a–b and receive portions of the biasing mechanisms 130a–b. The supports 110a–b are held adjacent the body 60 by the release mechanism (not shown), as described below.

The brackets 120a–b each includes a cover portion 122 with wings 124. The fasteners 126 are held within the wings 124 so that they cannot be removed from the bracket 120a–b. To assemble the carrier mechanisms 100a–b, the ends of the sensor component 250 are positioned in the cylindrical surfaces 112 of the supports 110a–b. The brackets 120a–b are then positioned adjacent the ends of the sensor component 250. The fasteners 126 on the brackets 120a–b are threaded into the threaded holes 116 in the supports 110a–b.

The use of brackets 120a–b and fasteners 126 as the attachment technique is simple and can reduce the amount of time to mount the sensor component 250 in the clamp mechanism 50 during well completion, if necessary. Furthermore, the use of brackets 120a–b with fasteners 126 can be compatible with the requirements for a transportation receptacle for the sensor mechanism 200 disclosed in U.S.

patent application Ser. No. 10/266,715, filed Oct. 6, 2002 which has been incorporated herein by reference.

Although the intra-station cables 230 and 260 of the sensor mechanism 200 preferably include capillary tubes made from INCONEL or MONEL alloys with an outer diameter between 1/16" and 1/8", the cover portions 122 of the brackets 120a–b preferably extend beyond the ends of the sensor component 250 to provide additional protection to the intra-station cables 230 and 260. The cover portions 122 can also help to reduce the probability of clogging of loose materials, such as mud or sludge, inside the recesses 84a–b. For example, the brackets 120a–b preferably have an open structure to prevent clogging and can define holes (not shown). To further reduce the risk of clogging, the cover portions 122 can completely cover and form a seal with the recesses 84a–b of the body 60. The cover portions 122 also reduce the risk of jamming when the clamp and sensor mechanism 50 and 200 are retrieved together from a well. For example, the cover portions 122 have curved surfaces.

The first bracket 120a includes two contact points $P_1$ and $P_2$ for coupling to the casing of the well. The second bracket 120b includes a single contact point $P_3$, which has a hemispherical shape and is integrally formed on the second bracket 120b. The contact points $P_1$ and $P_2$ are positioned with a wide separation to achieve maximum stability when coupled to the casing. In the present embodiment, the contact points $P_1$ and $P_2$ constitute extensions of the fasteners 126 of the first bracket 120a. Alternatively, the contact points $P_1$ and $P_2$ can be extended metal portions integral to the bracket 120a, such as on the second bracket 120b.

The brackets 120a–b and three contact points $P_{1-3}$ are subject to wear as they contact the casing and may rub against the casing. Consequently, the three contact points $P_{1-3}$ are made of the same material as the brackets 120a–b and supports 110a–b, which are preferably made of martenistic, precipitation hardened stainless steel IJNS S1 7400 to reduce the wear during installation and operation.

The biasing mechanisms 130a–b are disposed between the clamp mechanism 50 and the carrier mechanisms 100a–b. The biasing mechanisms 130a–b push the carrier mechanisms 100a–b with mounted sensor component 250 away from the body 60 towards the casing. In the present embodiment, the biasing mechanisms 130a–b include two springs for each carrier mechanism 100a–b. The pairs of springs 130a–b are respectively positioned in indentations 132a–b formed in the intermediate recesses 84a–b. The bored holes 119 on the undersides of the supports 110a–b receive the other ends of the springs 130a–b.

A great variety of springs 130a–b can be used to optimize the force and the location of the pushing force on the carrier mechanisms 100a–b. Furthermore, the springs 130a–b can easily fit into the recesses 84a–b in the body 60. For the conditions found in the annulus of the well, the springs 130a–b are preferably composed of non-corrosive materials. In addition, the material of the springs 130a–b preferably does not degrade during repetitive movements. Examples of suitable corrosion resistant metal alloys for the springs 130a–b include, but are not limited to stainless steel, INCONEL, and INCOLOY. Other mechanical biasing mechanisms, such as leaf springs, could also be used.

In an alternative embodiment to the use of springs for the biasing mechanisms 130a–b, the required pushing force can be generated with magnetic elements (not shown). In this alternative embodiment, magnets are placed on the underside of the supports 110a–b and are place within the recesses 84a–b. The required pushing force to deploy the sensor component 250 away from the body 60 can be achieved by orienting the magnets to face poles of the same polarity (e.g., north to north). Biasing the carrier mechanisms 100a–b with magnets can allow for even better acoustical decoupling of the sensor component 250 from the body 60 and hence from the production tubing. Selection of appropriate characteristics and types of magnetic elements for use with the present invention requires consideration of temperature effects and tensile force versus separation of the magnetic elements, among other considerations.

As is known in the art, substantially strong magnetic elements can achieve a large force, but attention must be paid to the Curie temperature of the magnetic elements. Curie temperature represents the thermal limit for the atoms of the magnetic element to retain their magnetic alignment. Substantially strong magnetic elements can have Curie temperatures as low as only 80-degrees Celsius, for example. Because the biasing mechanisms 130a–b will be subject to high temperatures in the well, magnetic materials with a high Curie temperature have to be used. The Curie temperatures for three exemplary and suitable ferromagnetic elements are as follows: cobalt=1,130 degrees C.; iron=770 degrees C.; nickel=358 degrees C.

Figure 7:
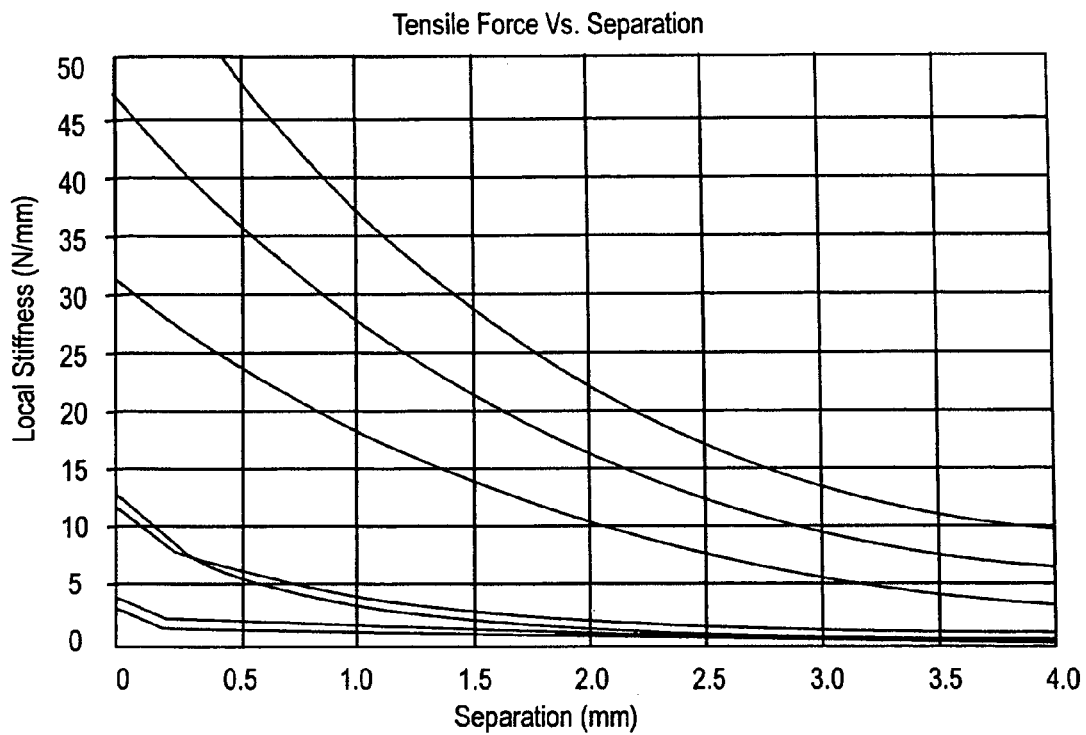
FIG. 7 illustrates a graph showing eight tensile force versus separation curves for magnetic materials of various dimensions.

In addition to a high Curie temperature, the magnetic elements must have an appropriate tensile force versus separation for elevated temperatures. Referring to FIG. 7, a graph shows eight local stiffness versus separation curves for various magnets, such as Neodymium Neo35 and ordinary ferrite (Y28) magnets of differing dimensions. As is known in the art, the tensile force from magnetic elements decreases very rapidly with increased separation of the elements. Typically, magnetic elements with Curie temperatures of about 250-degrees Celsius can have considerably lower tensile forces than desirable. For the present invention, Neodymium Neo35 having a maximum temperature of 250° C. can be used for high temperature applications. Ordinary ferrite (Y28) having a maximum temperature of 80° C. can be used for low temperature applications. One of ordinary skill in the art would find it a routine undertaking to select appropriate dimensions, number, and composition of magnets to provide a sufficient pushing force for use with the clamp mechanism 50 to press the sensor component 250 against the casing, even at the sensor component's maximum displacement from the body of 10 to 15-mm.

As best shown in FIG. 6, the intermediate recesses 84a–b respectively include guiding pins 144a–b, which extend substantially perpendicular to the axial dimension of the body 60. One guide pin 144a–b is provided for each support 110a–b so that the supports 110a–b and pins 144a–b can accommodate variations in tolerances, elongation, and angular orientation of the sensor component 250. The guide holes 142a–b have a larger dimension than the guide pins 144a–b.

Elastomeric elements (not shown), such as O-rings, are disposed between the guide pins 144a–b and the guide holes 142a–b. The elastomeric elements are used as buffers between the guide pins 144a–b and guide holes 142a–b, substantially eliminating any metal-to-metal contact therebetween. The elastomeric elements also centralize the carrier mechanisms 100a–b in the channel 80 by allowing the supports 110a–b to move laterally with respect to the pins 144a–b.

Because the tubing is subjected to vibrations that are induced by the production of effluents and undesired noise waves produced from the seismic source, the sensor mechanism 250 must be sufficiently acoustically decoupled from the production tubing. The flexibility of the elastomeric elements is used to minimize the acoustic coupling between the carrier mechanisms 100a–b and the clamp mechanism 50. Hence, use of the elastomeric elements can substantially acoustically decouple the sensor component 250 from the production tubing. As shown in FIG. 4A, the guide pins and guide holes can allow the carrier mechanisms 100a–b to move small distances in lateral directions La and Lb within the intermediate recesses 84a–b.

Figure 8:
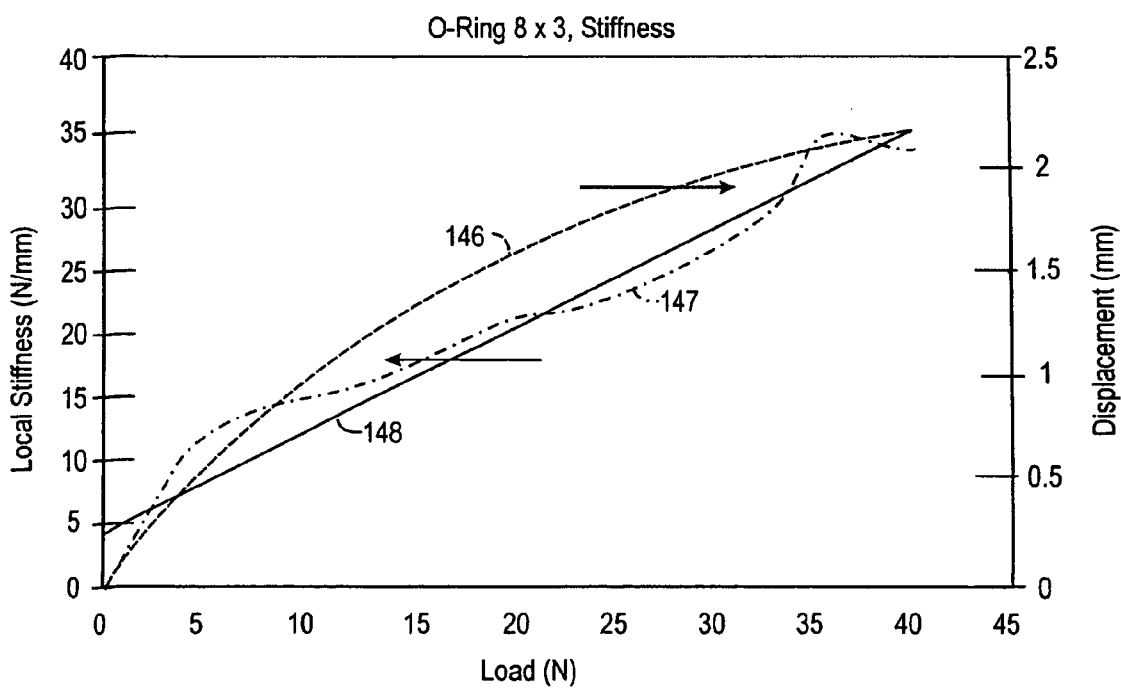
FIG. 8 illustrates a graph estimating the stiffness for an O-ring.

Referring to FIG. 8, a graph illustrates a first curve 146 of displacement versus load for an exemplary 0-ring. Also illustrated on the graph is a second curve 147 of local stiffness versus load. The exemplary 0-ring has an inner diameter of approximately 8-mm and a thickness of approximately 3-mm. As evidenced by the graph, the displacement versus load curve 146 is not a linear relationship. On the other hand, the "local stiffness "increases with the total load in an almost linear as shown by curve 147. As evidenced by the slope of line 148, which represents a "best fit "line of line 147, the graph shows that the effective "spring constant "of an 0-ring squeezed between two flat surfaces can be approximately 21-N/mm, which is the slope of line 148.

The material of the elastomeric elements is preferably soft but capable of withstanding the environment present in the annulus for an extended period of time. Suitable materials for the elastomeric elements include, but are not limited to, polymer materials resistant to high temperatures, such as silicone, Viton, TORLON (Polyamidimide), or PEEK (Polyetheretherketone). These materials can serve long-term temperatures higher than 250° C. and are suitable for in-well applications.

During assembly, the guide pins 144a–b respectively position in the guide holes 142a–b in the supports 110a–b. The guide pins 144a–b assure that the sensor component 250 is physically aligned inside the central recess 86. Contact of the guide pins 144a–b with the elastomeric elements and contact of the biasing members 130a–b with the supports 110a–b substantially assure that the sensor mechanism 250 is acoustically decoupled from the body 60 of the clamp mechanism 50.

The guide pins 144a–b include stops, shoulders, or widened portions (not shown) on their distal ends to keep the supports 110a–b of the carrier mechanisms 100a–b from coming out of the intermediate channels 84a–b during retrieval of the clamp mechanism 50. When the carrier mechanisms 100a–b are released from the body 60 so as to couple to the casing, the guide pins 144a–b allow the carrier mechanisms 100a–b to respectively shift or move in radial directions Ea and Eb, as shown in FIG. 4B. The carrier mechanisms can respectively move approximately 10 to 15-mm in directions $E_a$ and $E_b$. With each carrier mechanism 100a–b able to move radially ($E_a$ and $E_b$) and laterally ($L_a$ and $L_b$), the carrier mechanisms 100a–b including the sensor component 250 can slightly tilt and rotate when released and adjust to changes in the well due to temperature or irregularities in the casing. The slight tilting and rotating allows the sensor component 250 to be brought into contact with the casing even under imperfect conditions. One of ordinary skill in the art will appreciate that the dimensions provided herein are only exemplary and can be readily altered depending on the requirements of an intended application of the present invention.

Referring to FIGS. 9A–D, an embodiment of a release mechanism 150 with its surrounding components are shown for the disclosed clamp mechanism. In FIGS. 9A and 9C, plan views of portions of the clamp mechanism and release mechanism 150 are shown, with FIG. 9A showing the release mechanism 150 in an unreleased state and FIG. 9C showing the clamp in a released state. FIGS. 9B and 9D are respective cross-sections of FIGS. 9A and 9C, which better reveal the details of the release mechanism 150.

In FIGS. 9A and 9C, the portions of the clamp mechanism include first and second sides members 88a–b and first and second supports 110a–b. The second side member 88b and the first and second supports 110a–b are shown in cross-section to reveal internal components of the release mechanism 150. As best described above, the first and second side members 88a–b attach to the body 60 of the clamp mechanism with the sensor component (not shown) positioned therebetween. As also described above, the first and second supports 110a–b position adjacent the body 60 of the clamp mechanism and are used to support ends of the sensor component. The supports 110a–b define bores 119 for the springs 130a–b, guide holes 142 for the guide pins (not shown), and holes 116 for attaching to the carrier brackets (not shown).

The release mechanism 150 in the present embodiment uses the absolute well pressure to remotely release the supports 110a–b with sensor component attached thereto. As best shown in FIGS. 9A–B, the second side member 88b includes components of the release mechanism 150 installed therein. The release mechanism 150 includes a movable piston 160, a replaceable canister 170, and a sliding plate 180. The piston 160 is movably positioned in a bore 152 defined within the side member 88b. The piston 160 includes first and second heads 162a–b, first and second activating members 164a–b, and a stem 166. O-rings 163 are used on the heads 162a–b to promote smooth movement of the heads 162a–b in the bore 152.

The replaceable canister 170 is threaded in a wide portion 158 of the bore 152 adjacent the stem 166. The replaceable canister 170 includes a chamber 172, a rupture disc 174, and a threaded cap 176. The rupture disc 174 is welded to the end of the canister 170 so that the chamber 172 is hermetically sealed and filled with air at substantially one atmosphere. The threaded cap 176 holds the canister 170 with rupture disc 174 within the wide portion 158 of the bore 152.

The sliding plate 180 is movably positioned adjacent the body 60 and between the first and second side members 88a–b. A side portion 181 of the plate 180 is positioned underneath the piston 160 in the second side member 88b. The side portion 181 defines first and second slots 186a–b, which receive the activation members 164a–b of the piston 160 therein.

A first end 182a of the plate 180 is positioned underneath the first support 110a, and a second end 182b is positioned underneath the second support 110b. The first and second ends 182a–b each include a pair of holding members or keys 184a–b, which engage key slots 111a–b defined in the supports 110a–b.

In FIGS. 9A–B, the release mechanism 150 is shown in an unreleased state holding the first and second supports 110a–b adjacent the body 60. Hence, the sensor component (not shown), which is mounted between the supports 110a–b is also not released, which is suitable when the clamp mechanism is being transported and deployed.

As best shown in FIG. 9B, the activating members 164a–b extend from the piston 160 and position in the slots 186a–b defined in the side portion 181 of the plate 180. The stem 166 of the piston 160 is positioned through a narrow portion 156 of the bore 152. An O-ring 167 is provided about the stem 166 adjacent the first head 162a for reducing shock when the piston 160 is released. The end of the bore 152 adjacent the narrow portion 156 defines a port 154 for fluid to escape when the piston 160 is moved. Another O-ring 168 is provided adjacent the distal end of the stem 166 to promote smooth movement of the stem 166.

In the unreleased state of FIGS. 9A–B, the keys 184a–b on the ends 182a–b of the plate 180 are engaged in the key slots ill a–b defined in the supports 110a–b. Consequently, the supports 110a–b with the mounted sensor component (not shown) are held adjacent the body 60 of the clamp mechanism. Although two keys 184a–b and two slots 111a–b are used in the present embodiment, it is understood that more or fewer keys or slots can be used depending on the space available, the sizes of the keys and slots, and the amount of engagement required between the keys and slots.

Once deployed in the well, fluid in the well impregnates the unsealed passages and crevices of the release mechanism 150. Only the chamber 172 of the canister 170 is hermetically sealed from the well fluid. Thus, fluid pressure can seep through the port 154, into the bore 152, past the O-ring 168 via the narrow portion 156. In this regard, the O-rings 163, 167, and 168 are primarily used for guiding the piston 160 and stem 166 and are not used for sealing out the high pressure well fluid. This means that fluid may also be able to seep past the O-rings 163, which may be of no consequence. Consequently, fluid pressure of the well acts on the side of the rupture disc 174 adjacent the stem 166, and the atmospheric pressure in the chamber 172 acts against the other side of the disc 174. A considerable pressure differential develops across the rupture disc 174 as the clamp mechanism is deployed in the well. When the absolute pressure in the well exceeds the differential pressure rating of the rupture disc 174, the disc 174 bursts.

As is known in the art of rupture discs, the rupture disk 174 is designed to rupture at a predetermined pressure differential. A combination of material thickness, material selection, surface area, and geometry of the disc 174 are used to regulate the predetermined pressure differential at which it will rupture. Rupture disks 174 can have a non-fragmenting design and may not require vacuum support. Rupture disks can be made of numerous materials known in the art and can range in sizes from ½" (12-mm) to 60" (1200-mm), for example. Furthermore, rupture disks are known in the art that can be resistant to corrosion, can withstand operating temperatures up to 400° F. or even 800° F., can be designed for a wide range of burst pressures, can have tight burst pressure tolerances, and can have low flow resistance.

Consequently, a suitable rupture disk 174 for the disclosed clamp mechanism can be selected for a given application and differential pressure rating, which can vary from application to application. Thus, depending on the intended final position of the clamp mechanism and the pressure levels in the well, an appropriate canister 170 with an appropriate rupture disc 174 can be installed in the wide portion 158 and held therein with the cap member 176 so that the release mechanism 150 is activated when subjected to a predetermined pressure or depth in the well.

Referring the FIGS. 9C–D, the rupture disk 174 is shown ruptured. When rupturing, metal segments of the disk 174 can fold back to provide an opening therethrough. After the disc 174 ruptures, well pressure rushes to fill the low pressure chamber 172, causing the piston 160 to move in direction A in the bore 152. It should be noted that the pressure differential is sufficient to move the piston 160 without-the-use of additional springs or mechanical mechanisms. As the first head 162a is moved in direction A, well fluid in the bore 152 is allowed to escape from the port 154. The O-ring 167 adjacent the first head 162a can be used to lessen the shock produced when the piston 160 is moved with considerable force in direction A. In addition, the port 154 can have a small, predetermined cross-section to limit the escape of well fluid from the bore 152 so that the well fluid can also act to dampen the movement of the piston 160 in direction A.

With the movement of the piston 160, the activating members 164a–b shift position and cause the sliding plate 180 to also shift position. The holding members or keys 184a–b are moved within the key slots 111a–b. The supports 110a–b are released, and the compressed biasing members 130a–b push the supports 110a–b away from the body 60. As a result, the shift of the release mechanism 150 in the single direction A releases both supports 110a–b simultaneously, which reduces risks of tilting and jamming of the release mechanism 150, supports 110a–b, and sensor component during release.

Any resonance created by the components of the release mechanism 150 can be minimized with the numerous O-rings 163, 167, and 168 used. The friction from the O-rings 163, 167, and 168 can help to secure the piston 160 and stem 166 in the unreleased and released positions. The sliding plate 180 can be provided with devices for facilitating and dampening its movements, as well.

After the release mechanism 150 is activated, it is understood that the keys 184a–b should not interfere with the supports 110a–b. Consequently, the keys 184a–b preferably have a low profile above the surface of the plate 180. It is understood that the release mechanism 150 can be designed to accommodate the effects of pressure and temperature within the well. In addition, it is understood that the chamber 152 and the port 154 can be designed to reduce the potential of clogging or other problems associated with well fluid.

Figure 10A:
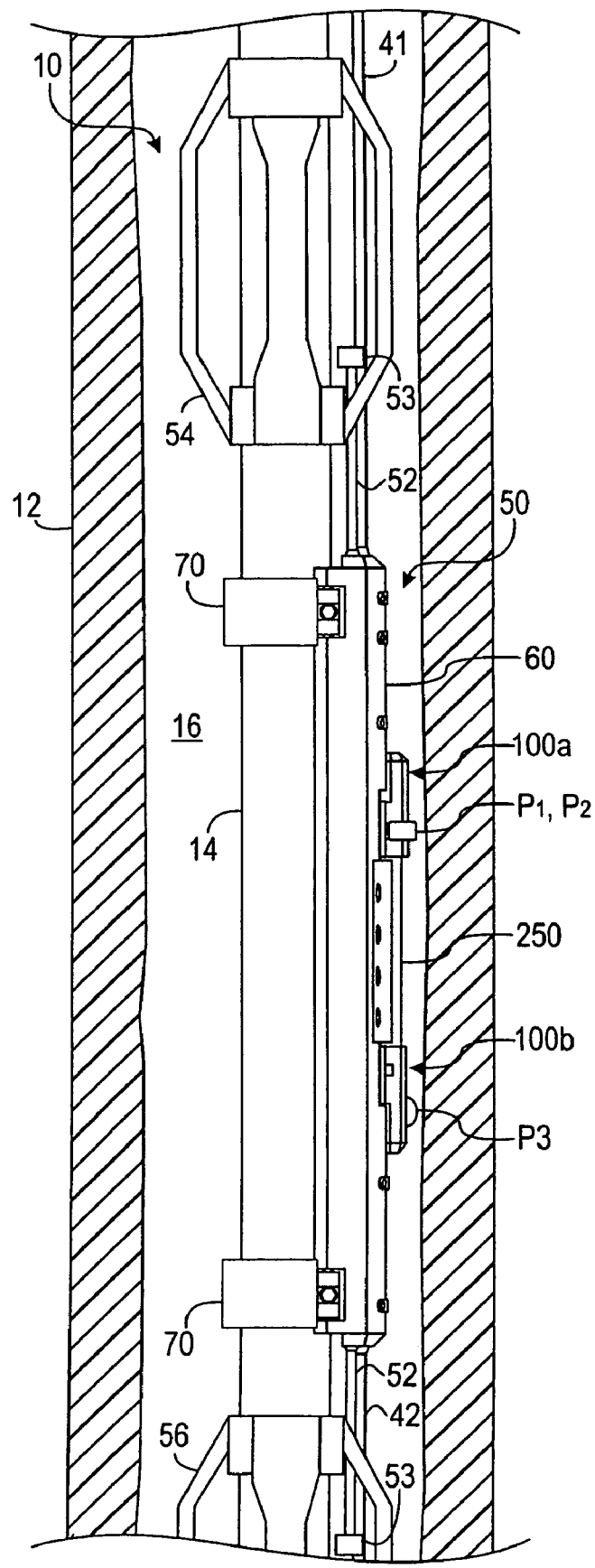
FIGS. 10A–B illustrate the clamp mechanism and the sensor mechanism of the present invention in stages of use in a well.
Figure 10B:
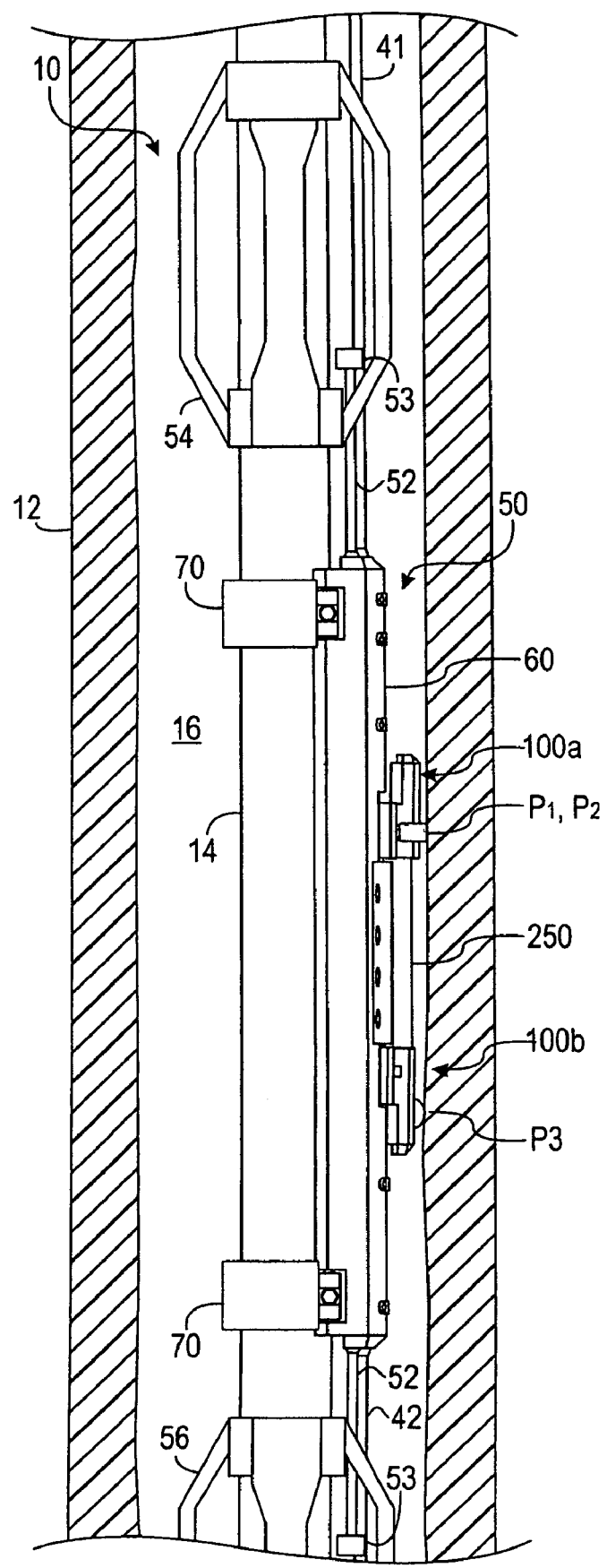

Referring to FIGS. 10A–B, the seismic station having a clamp mechanism 50 and sensor mechanism 200 is illustrated in stages of use in a well. Preferably, the sensor mechanism 200 is pre-assembled and installed in the clamp mechanism 50 prior to transportation to the well 10. Furthermore, the clamp mechanism 50 with installed sensor mechanism 200 is preferably transported, deployed, and retrieved using a system and method as disclosed in U.S. patent application Ser. No. 10/266,715, filed Oct. 6, 2002 and is incorporated herein by reference in its entirety.

In FIG. 10A, the seismic station is shown during deployment in the annulus 16 of the well 10. As is known in the art, devices or portions thereof that become loose or break off in the annulus 16 can be extremely difficult and expensive to retrieve, if even possible, and can even render a well unusable. Consequently, the clamp mechanism 50 with installed sensor mechanism 200 preferably includes redundant techniques for coupling the clamp mechanism 50 to the tubing 14. The clamp mechanism 50 is coupled to the tubing 14 using the clamp members 70, as described earlier. In addition, first and second anchor clamps 54 and 56 connect to the rods 52 extending from the body 60. The rods 52 are slidable within the anchor clamps 54 and 56 to allow for thermal expansion and deformation during use. The rods 52 include stops 53 on their distal ends to prevent removal from the anchor clamps 54 and 56.

During deployment, the clamp mechanism 50 is preferably capable of only coming in contact with the casing 12 along one or two lines or at a couple of points depending on the orientation inside the casing 12. This is facilitated by the curved surface profile of the clamp mechanism 50 discussed above. Also, the clamp mechanism 50 is situated primarily on one side of the tubing 14, and is approximately 70 to 100-cm in length. Placing most of the clamp mechanism 50 on one side of the production tubing 14 helps to open the cross-section of the annulus 16 to prevent clogging. Additional cable tracks (not shown) can be included on both sides of the clamp mechanism 50 for running additional cables and devices along the tubing 14.

During deployment, the release mechanism (not shown) maintains the carrier mechanisms 100a–b locked in the channel defined in the body 60. The sensor component 250 mounted in the carrier mechanisms 100a–b is kept in correct position and is protected by the channel and the carrier mechanisms 100a–b. Preferably, the three contact points $P_{1-3}$ on the carrier mechanisms 100a–b do not touch the casing 12 during deployment to minimize the risk of wear and damage to them.

Referring to FIG. 10B, the clamp mechanism 50 is lowered to a predetermined depth within the annulus 16. Hydrostatic pressure in the annulus 16, indicative of a particular depth, triggers the release mechanism on the clamp 50 as described in detail above. The biasing mechanisms (not visible) disposed between the body 60 and the carrier mechanisms 100a–b move the carrier mechanisms 100a–b with mounted sensor component 250 approximately 10 to 15-mm towards the casing 12 to make contact with and to acoustically couple to the casing 12. Once acoustically coupled to the casing 12, the carrier mechanisms 100a–b can be used to transfer seismic signals from the casing 12 to the sensor component 250 mounted therein.

As noted above, the biasing mechanisms 130a–b push the carrier mechanisms 100a–b with mounted sensor component 250 towards the casing 12. Determining the required and optimal pushing force of the biasing members 130a–b requires consideration of a number of constraints, including consideration of achieving an acceptable seismic coupling in both vertical and horizontal wells and of avoiding unacceptable shock during the release of the carrier mechanisms 100a–b and sensor component 250. The minimum required force from the biasing members 130a–b also depends on the weight of the assembled carrier mechanisms 100a–b and sensor component 250, the stiffness of the intra-station cables 230 and 260 coupled to the sensor component 250, the viscosity of any material in the well, and the type of well in which the mechanisms are deployed (e.g., a vertical, deviated, or horizontal well), among other variables. There is an obvious trade-off between reliable clamping, force from the guiding pins, and risk of resonance and shock during the release operation. Based on evaluations, the use of springs is preferred for the biasing mechanisms 130a–b for the high temperature applications in a well.

The positioning of the biasing mechanisms 130a–b with respect to the contact points $P_{1-3}$ provides stability and reduces the risk of unwanted resonance. In this regard, it can be preferable to position the contact points $P_{1-3}$ at a further lateral distance than the biasing mechanisms 130a–b. The resonance of the biasing mechanisms 130a–b must also be taken into consideration. The pushing force of the biasing mechanisms 130a–b is also preferably optimized to minimize the risk of vibration of the sensor mechanism 250 when deployed against the casing 12. In the present embodiment, the assembled carrier mechanisms 100a–b and sensor component 250 weigh approximately 2 to 3-kg. The biasing mechanisms 130a–b are preferably capable of providing a pushing force that is approximately three to four times the weight of the sensor component 250 with the assembled carrier mechanisms 100a–b to ensure adequate coupling with the casing 12, which is believed to reduce the probability of resonance without reducing sensor sensitivity. This level of force is also sufficient to overcome the usually insignificant resistance of the thin, intra-station cables. One of ordinary skill in the art will appreciate that the stiffness and pushing force of the biasing mechanisms 130a–b provided above are only exemplary and can be readily altered depending on the requirements of an intended application of the present invention.

The three points of contact $P_{1-3}$ can adjust to the surface of the casing 12 independent of curvature in the casing dimensions, deformations, roughness, and position. For illustrative purposes, the surface of the casing 12 in FIGS. 10A–B is shown as slightly irregular, although it is understood that the actual surface of the casing can be quite different. In this regard, those of ordinary skill in the art will recognize that the casing 12 may not have a perfectly uniform diameter, because it is subject to damage, stresses, and drift. Moreover, junctions between various pieces of the casing string might cause the casing diameter to be non-uniform. Thus, the clamp mechanism 50 may encounter irregularities on the surface of the casing 12 of about 10-mm, for example. Moreover, the inner surface of the casing 12 can be rough after production and can become even worse due to contamination and corrosion. The three contact points $P_{1-3}$ can adapt to variation in surface finish, casing irregularities, and diameters of the casing 12 in the well 10.

The clamp mechanism 50 can be retrieved from the annulus 16 of the well 10 by raising the production tubing 14, even if the release mechanisms have released the sensor components. In this circumstance, the carrier mechanisms 100a–b, specifically the contact points $P_{1-3}$, will remain biased towards the casing 12 and hence will rub against the casing 12 as the clamp mechanism 50 is retrieved. However, this level of friction between the contact points $P_{1-3}$ and the casing 12 will not be so severe as to damage the casing 12 or significantly impede the ability to retrieve the production tubing 14. After retrieval, the clamp mechanism 50 or certain components thereon (e.g., contact points $P_{1-3}$, brackets, rupturing disk) may need to be replaced if a subsequent deployment is envisioned.

Referring to FIGS. 11–13D, another embodiment of a clamp mechanism 350 according to the present invention is illustrated. In FIG. 11, the clamp mechanism 350 is illustrated in a plan view. In FIG. 12, the clamp mechanism 350 of FIG. 11 is illustrated in a side cross-section. In FIGS. 13A–D, the clamp mechanism 350 of FIG. 11 is illustrated in various end cross-sections to reveal internal components.

With exceptions noted below, the clamp mechanism 350 of the present embodiment is substantially similar to the embodiment disclosed above. Consequently, the materials used for the clamp mechanism 350 of the present embodiment are similar to those disclosed above.

The clamp mechanism 350 includes a body 360, brackets 390a–b, carrier mechanisms 400a–b, and biasing mechanisms 430a–b. The body 360 has first and second sides 362 and 364 and has first and second ends 366 and 368. The clamp mechanism 350 is approximately 27.875-inches from end 366 to end 368. As best shown in the end cross-section of FIG. 13A, the second side 364 defines a radius substantially equivalent to the radius of the intended production tubing 14. In the present example, the production tubing 14 has a diameter of approximately 4-inches. Therefore, the second side 364 defines a radius of about 2-inches. The second side 364, however, can be modified to fit tubing of other diameters. The snug contact between the second side 364 and the tubing 14 can be advantageous in preventing damage to the clamp mechanism 350 during deployment and retrieval.

The body 360 is attached to adjacent the production tubing 14 with the attachment devices 370a–b. The attachment devices 370a–b are clamp rings encompassing the body 360 and the tubing 14. The clamp rings 370a–b can include a hinge (not shown) allowing them to be positioned around the body 360 and the tubing 14. The clamp rings 370a–b can then be welded closed about the body 360 and tubing 14. The clamp rings 370a–b are robust and protect a major portion of the clamp mechanism 350, yet still allow for a substantially open cross-section for the passage of well fluid past the clamp mechanism 350. In addition to using the attachment devices 370a–b to attach the clamp mechanism 350 to the tubing 14, the body 360 can be held by support rods (not shown) and anchor clamps (not shown), such as described above.

As another robust feature, a plurality of steel ribs 372, 374, and 376 are interconnected between the clamp rings 370a–b. The ends of the ribs 372, 374, and 376 are preferably welded to the clamp rings 370a–b, which are also made of steel. The use of the ribs 372, 374, and 376 provides protection to the clamp mechanism 350 as it is deployed and retrieved from the well. Moreover, the ribs 372, 374, and 376 provide an open cross-section to allow well fluid to flow past the clamp mechanism 350.

Figure 13A:
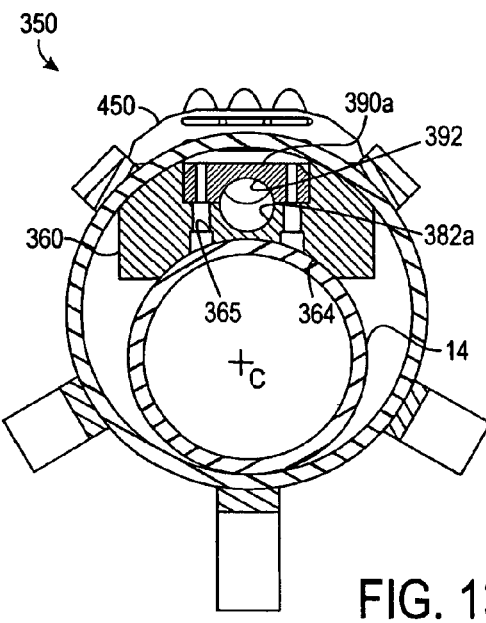
FIGS. 13A–D illustrate various end cross-sections of the clamp mechanism of FIG. 11.
Figure 13B:
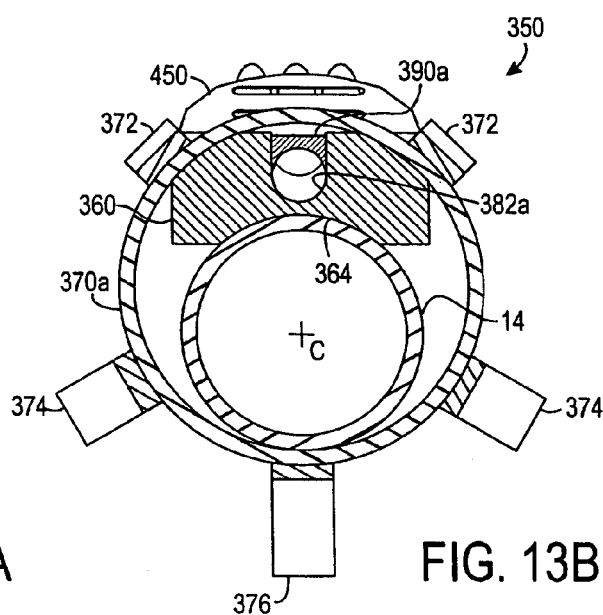

As best shown in the end section of FIG. 13B, the ribs 372, 374, and 376 extend different distances from the clamp rings 370a–b. The distances define a substantially concentric diameter with respect to the diameter of the tubing 14. In the present embodiment, all of the ribs 372, 374, and 376 extend approximately 4.198-inches from the central axis C of the tubing 14. From the cover 450 to the third rib 376, the clamp mechanism 350 thus measures approximately 8.396-inches. With these dimensions, the clamp mechanism 350 is capable of fitting in the annulus formed between the 4-inch production tubing 14 positioned inside an approximately 8.5-inch inner-diameter casing. The contact points $P_{1-3}$ extend approximately 0.396-inches beyond the cover 450 when released as shown. Thus, the maximum lateral dimension from the contact points $P_{1-3}$ to the rib 376 is approximately 8.792-inches. One of ordinary skill in the art will appreciate that the dimensions provided above are only exemplary and can be changed depending on the size of casing and tubing for the intended application of the present invention.

As best shown in FIG. 12, a channel 380 is defined in the first side 362 of the body 360 from the first end 366 to the second end 368. The channel 380 is used to house a multiple component sensor mechanism (not shown), such as that described above. The channel 380 includes end recesses 382a–b, intermediate recesses 384a–b, and a central recess 386. The end recesses 382a–b respectively communicate with the ends 366 and 368 of the body 360 and house the splice components (not shown). The intermediate recesses 384a–b respectively communicate the end recesses 382a–b with the central recess 386. The intermediate recesses 384a–b house the carrier mechanisms 400a–b and the biasing mechanisms 430a–b. The central recess 386 houses the sensor component (not shown), which is held by the carrier mechanisms 400a–b. The intra-station cables (not shown) of the sensor mechanism are housed between the end recesses 382a–b and the intermediate recesses 384a–b.

For added protection to internal components, a cover 450 is positioned over the intermediate recesses 384a–b and the central recess 386. The cover 450 protects the carrier mechanisms 400a–b and components of the sensor mechanism, such as the intra-station cables (not shown) and the sensor component (not shown). As best shown in the end cross-section of FIG. 13D, the cover 450 is attached to the body 360 using a plurality of fasteners (not shown). The fasteners insert into holes 367 in the second side 364 of the body and attach to threaded holes 457 in the cover 450. The fasteners are preferably not exposed outside of the cover 450, which reduces the potential of the fasteners being damaged.

As best shown in FIG. 11, the cover 450 defines holes 454 through which the three contact points $P_{1-3}$ extend for potential contact with the casing of the well. The cover 450 preferably defines a plurality of slots 452 to allow well fluid to flow through the cover 450, which can reduce the potential of clogging problems. The cover 450 also preferably has angled surfaces, which can reduce the potential of jamming within the casing when deployed.

As opposed to the numerous mounting members used in the previous embodiment, the clamp mechanism 350 of the present embodiment uses elongated mounting members 390a–b to firmly hold the splice components within the end recesses 382a–b. The elongated mounting members 390a–b substantially encompass the length of the components and provide protection to them. As best shown in the end section of FIG. 13-A, the mounting member 390a defines a cylindrical surface 392 to match the cylindrical housings of the splice component. Fasteners (not shown) are used to hold the mounting member 390a to the body 360. The fasteners mount into fastener holes 365 in the second side 364 of the body 360 and attach to the mounting member 390a. The other mounting member 390b for the other splice component is substantially the same. Four fasteners are used for each mounting member 390a–b. Mounting the fasteners from the second side 364 prevents them from becoming loose in the annulus of the well if any damage to the clamp mechanism 350 occurs.

As best shown in FIG. 12, the carrier mechanisms 400a–b are positioned in the intermediate recesses 384a–b respectively and are used to hold ends of the sensor component (not shown). The carrier mechanisms 400a–b include supports 410a–b and brackets 420a–b. The ends of the sensor component are respectively positioned between the supports 410a–b and brackets 420a–b, as in the embodiment disclosed above. The supports 410a–b and brackets 420a–b define cylindrical surfaces to match the cylindrical housing of the sensor component. For example, the support 410a and bracket 420a in FIG. 13C define an opening 412 to match the circular cross section of the sensor component described above.

Figure 13C:
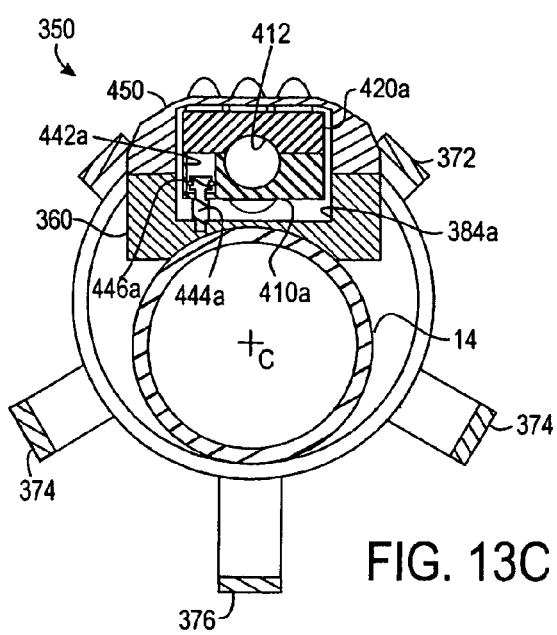
Figure 13D:
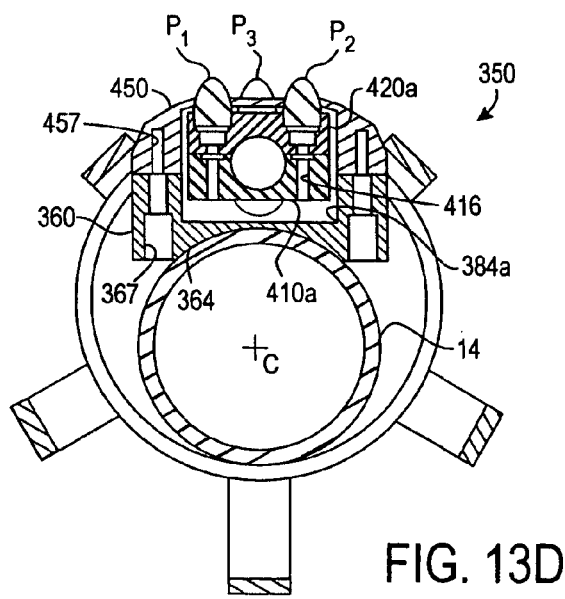

As best shown in FIG. 13D, two fasteners (not shown for clarity) are used to connect the support 410a to the bracket 420a. The fasteners mount into holes 416 in the bottom of the support 410a and through aligned holes in the bracket 420a. The ends of these two fasteners thread into the contact portions $P_1$ and $P_3$ disposed in the bracket 420a. The biasing mechanism 430a is disposed in the recess 384a and engages the support 410a. The support 410a is locked in position with the release mechanism (not shown), as described in more detail below.

As best shown in FIG. 13C, the support 410a defines a guide hole 442a. A guide pin 444a is connected to the body 360 in the intermediate recess 384a and is disposed in the guide hole 442a. The guide pin 444a extends substantially perpendicular to the axial dimension of the body 360. The guide hole 442a has a larger dimension than the guide pin 444a, allowing the supports 410a to move on the pin 444a. The guide pin 444a has a stop on its distal end for engaging a shoulder of the guide hole 442a to limit movement of the support 410a in the recess 384a.

An elastomeric element 446a, such as an O-ring, is disposed on the end of the guide pin 444a. The O-ring 446a engages the inner surface of the hole 442a to acoustically decouple the support 410a from the guide pin 444a and the body 360, as in the embodiment disclosed above. The guide pin 444a extends into the intermediate recesses 384a–b a distance at least equivalent to the amount of required movement of the contact points $P_{1-3}$ to couple with the casing of the well. The guide pin 444a includes a shoulder on its distal ends to keep the supports 410a from coming out of the intermediate channels 384a during retrieval of the clamp mechanism 350. The guide pin 444a allows the carrier mechanisms 400a to move approximately 10 to 15-mm.

The other support 410b defines a similar guide hole having a similar guide pin disposed therein, but is positioned on the other side of the central axis C. Consequently, the carrier mechanisms 400a–b and pins 444a–b can accommodate variations in tolerances, elongation, and angular orientation of the sensor component mounted therein.

As in the first embodiment, the biasing mechanisms 430a–b are preferably springs disposed between the intermediate recesses 384a–b and the supports 420a–b. As earlier, two adjacent springs 430a–b are used for each carrier mechanism 400a–b, which are disposed in partial bores (not shown) formed in the bottom of the supports 420a–b. The biasing members 430a–b push the carrier mechanisms 400a–b with attached sensor component away from the body 360 towards the casing when the release mechanism is activated.

The first carrier 400a includes two contact points $P_1$ and $P_2$. As best shown in FIG. 13D, the contact points $P_1$ and $P_2$ are positioned on either side of the cylindrical opening defined between the support 410a and the bracket 420a. The contact points $P_1$ and $P_2$ are disposed in holes in the bracket 420a. Fasteners (not shown) are used to hold the contact points $P_1$ and $P_2$ from underneath the points so as not to be damaged. Ends of the contact points $P_1$ and $P_2$ are capable of disposing through the openings 454 defined in the cover 450 for coupling with the casing of the well. The second carrier mechanism 400b includes one contact point $P_3$, which is substantially aligned with the central axis C of the clamp mechanism 350 and tubing 14. As best shown in FIG. 12, the single contact point $P_3$ is fastened to the second bracket 420b with a fastener (not shown) from underneath.

Figure 14A:
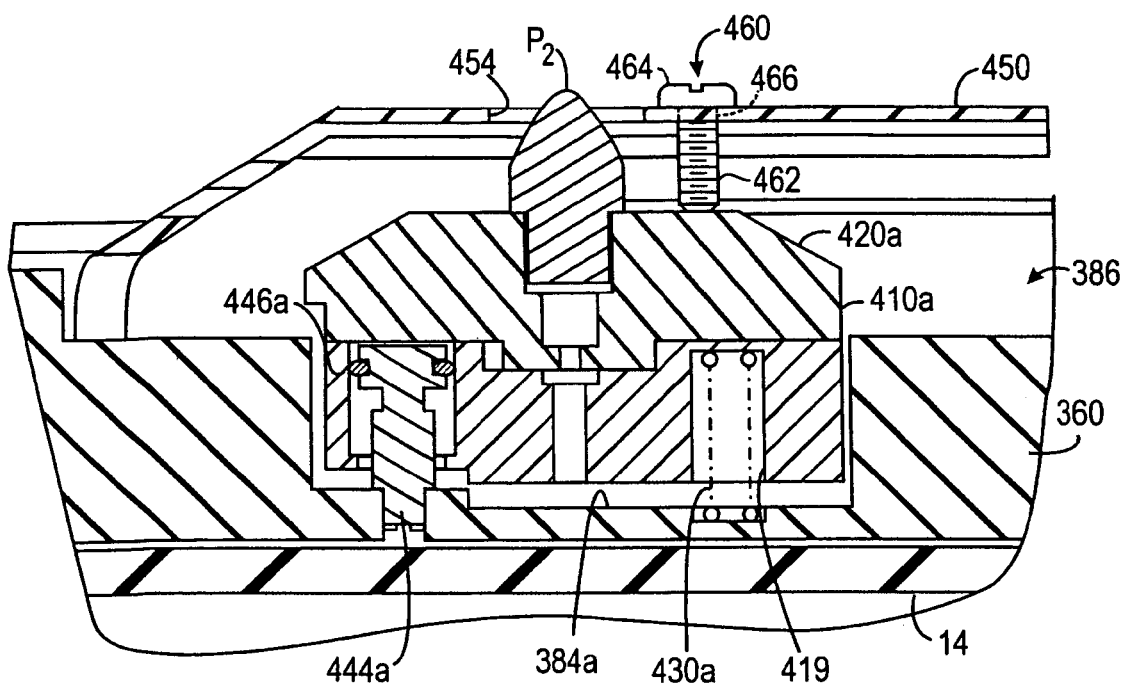
FIGS. 14A–B illustrate a detailed cross-section of a portion of the clamp mechanism of FIG. 11, showing another embodiment of a release mechanism according to the present invention.
Figure 14B:
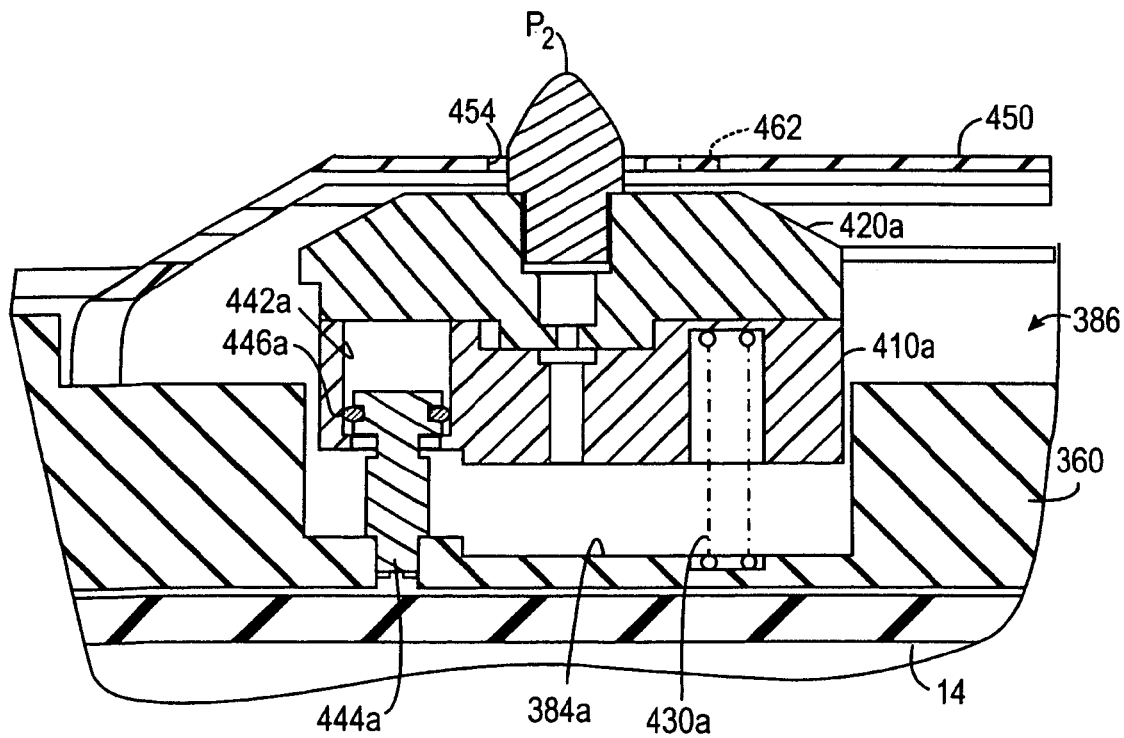

Referring to FIGS. 14A–B, a detailed cross-section of a portion of the clamp mechanism 350 of FIG. 11 along viewing line 14—14 is illustrated. The clamp mechanism 350 includes a release mechanism 460. In FIG. 14A, the release mechanism 460 is shown installed in the cover 450 and holding the carrier mechanism 410a adjacent the body 60. Thus, the contact point $P_2$ is positioned substantially within and protected by the cover 450. This position is suitable for deployment of the clamp mechanism in a well so that the contact point $P_2$ will not be damaged.

The release mechanism 460 is preferably a fastener, bolt, screw, or other like mechanism. The release mechanism 460 has a threaded portion 462 and a head portion 464. The threaded portion 462 is threaded through a threaded aperture or hole 466 in the cover 450.

The release mechanism 460 is entirely or partially composed of a dissolvable or biodegradable polymer, such as thermoplastic polyvinyl alcohol (PVA) or polyvinyl acetate (PVAc) having a combination of additives. For example, Millennium Plastics Corporation produces dissolvable polymers using a technology described in U.S. Pat. No. 5,948, 848. The technology is based on a method of manufacturing thermoplastic polyvinyl alcohol (PVA) in combination with other approved food-grade additives commonly used in commercial and consumer plastic products. Ordinarily, PVA rapidly degrades in contact with water or moisture making it not very useful for typical industrial applications. However, PVA or similar polymers can be made that are impervious to liquid dissolution for a desired amount of time. By using different combinations and ratios of the basic constituent ingredients, the firmness and solubility of the resulting polymer can be tailored to a particular application.

The polymer used with the release mechanism 460 is formulated to degrade in the conditions of the well within a predetermined amount of time. For example, the polymer may be designed to dissolve in a matter of hours or days of exposure to the well fluid. When the clamp mechanism 350 is assembled, the intact fastener 460 is threaded into the aperture 466 in the cover 450 to hold the carrier mechanism 400a adjacent the body 360. A similar fastener is used for the other carrier mechanism (not shown) on the other end of the sensor mechanism (not shown). However, it is understood that a single dissolvable fastener 460 can be centrally threaded in the cover 450 and engage the midpoint of the sensor component, or that multiple dissolvable fasteners could be used.

When the clamp mechanism 350 is deployed in the well, the dissolvable fastener 460 remains intact until a predetermined amount of exposure to the well conditions has occurred. In FIG. 14B, the release mechanism 460 has dissolved completely or has dissolved enough to be forced loose from the aperture 462. Consequently, the compression springs 430a extend and push the carrier mechanism 400a towards the cover 450, and the contact point $P_2$ extends beyond the hole 454 for acoustically coupling with the casing of the well.

It is understood that the head portion 464 outside the cover 450 preferably has a small profile to reduce the chance of being damaged. It will also be appreciated that the release mechanism 460 need not be entirely composed of dissolvable polymer to affect release. However, the release mechanism 460 is preferably completely dissolvable so that components of the release mechanism 460 are not left loose in the annulus of the well or within the clamp mechanism 350 after release.

Figure 15A:
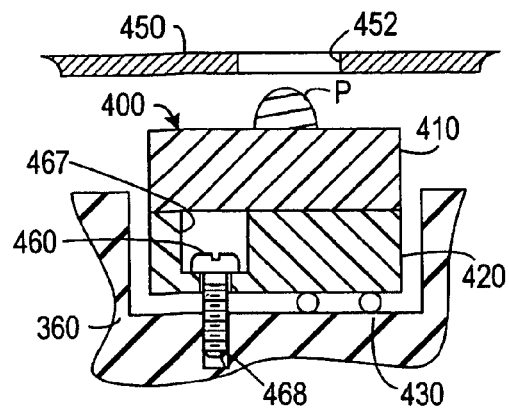
FIGS. 15A–D illustrate various embodiment of release mechanisms composed of a dissolvable polymer.

The release mechanism 460 need not be a fastener threaded in the cover 450. Referring to FIGS. 15A–D, various embodiments of release mechanisms 460, 470, 480, and 490 composed of dissolvable polymer are schematically illustrated. In FIG. 15A, the release mechanism 460 is a dissolvable fastener positioned in a bore 467 in a support 420 of a carrier mechanism 400. The dissolvable fastener 460 is threaded into a threaded hole 468 in the body 360. Once the fastener 460 dissolves in the well fluid, the biasing mechanism 430 can move the carrier mechanism 400 away from the body. A substantially similar arrangement can be used for both carrier mechanisms connected to the ends of the sensor component. The reverse arrangement can be used, as well. For example, the dissolvable fastener 460 can be inserted from the bottom of the body through a hole 468 and can be threaded into the hole 467 in the support 420.

Figure 15B:
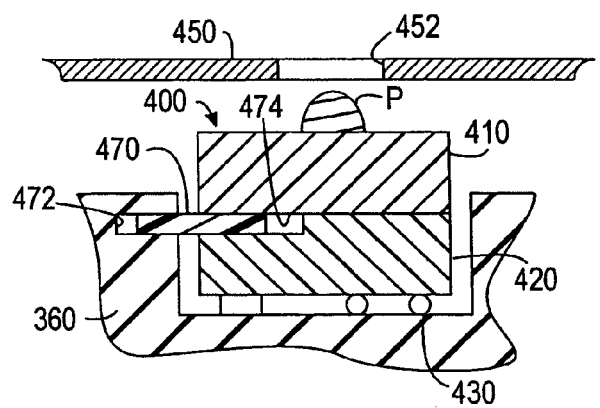

In FIG. 15B, the release mechanism 470 is a pin or plate composed of dissolvable polymer installed between the body 360 and the carrier mechanism 400 to hold the carrier mechanism 400 adjacent the body 360. One end of the pin 470 is inserted in an opening 472 in the body 360, and the other end is inserted in to a slot 474 in the support 420. To assemble, the support 420 is positioned adjacent the body 360. The pin 470 is positioned in the opening 472 and slot 474. The carrier bracket 410 is then attached to the support 420 to hold the sensor component (not shown). The pin 470 prevents the carrier mechanism 400 from being moved by the biasing mechanism 430 until dissolved.

Figure 15C:
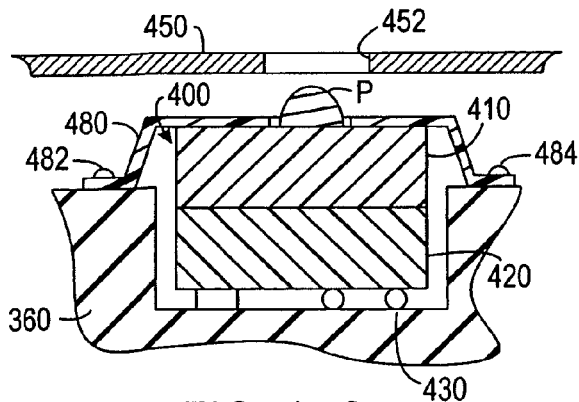

In FIG. 15C, the release mechanism 480 is a band or strip of dissolvable polymer attached to the body 360. Ends 482 and 484 of the band 480 are attached to the body 360, and the band 480 extends over the carrier mechanism 400 and holds it adjacent the body 360. The band 480 prevents the carrier mechanism 400 from being moved by the biasing mechanism 430 until dissolved.

Figure 15D:
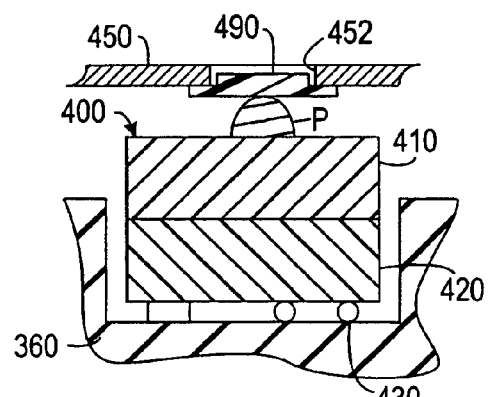

In FIG. 15D, the release mechanism 490 is a cap composed of dissolvable polymer. The cap 490 is positioned between the contact point P and the hole 452 in the cover 450. The cap 490 prevents the contact point P from extending beyond the cover 450 until dissolved. The cap 490 could be threaded and screwed on to the cover 450, as well.

It is understood that the dissolvable release mechanisms 460, 470, 480, and 490 according to the present invention preferably do not significantly interfere with the release of the carrier mechanism 400 and sensor component once partially dissolved. However, attention should be paid to the location and size of the dissolvable release mechanism 460, 470, 480, and 490 relative to moving components. With the benefit of the above embodiments and the present disclosure, it will be appreciated that a release mechanism composed of dissolvable polymer can include a number of structures and can be positioned in a number of locations to temporarily hold the carrier mechanisms adjacent the body. As such, one of ordinary skill in the art will appreciate that a dissolvable release mechanism according to the present invention is not strictly limited to the explicit embodiments illustrated herein.

As used herein, "sensor system" denotes both a plurality of sensors or an individual sensor.

It is intended that the invention include all modifications and alterations to the full extent that such modifications and alterations come within the scope of the following claims or the equivalents thereof.

What is claimed is:

1. An apparatus for acoustically coupling a sensor system to a wall of a well having a deployment member positioned therein, comprising:
    a body comprising a clamp for coupling the body to the deployment member;
    a sensor system positioned within the body, wherein the sensor system is optical based;
    at least one biasing mechanism capable of displacing the sensor system away from the deployment member and toward the wall; and
    a release mechanism for actuating the biasing mechanism to displace the sensor system.

2. The apparatus of claim 1, further comprising at least one sensor system carrier coupled to the sensor system, and wherein the biasing mechanism contacts the sensor system carrier to displace the sensor system.

3. The apparatus of claim 2, wherein the sensor system carrier comprises at least one node for contacting the wall.

4. The apparatus of claim 2, wherein the sensor system carrier comprises a first and second component affixed around the sensor system.

5. The apparatus of claim 1, further comprising first and second sensor system carriers coupled to the sensor system, and wherein the biasing mechanisms contact the first and second sensor system carriers to displace the sensor system.

6. The apparatus of claim 5, wherein the first and second sensor system carriers are positioned on opposite ends of the sensor system.

7. The apparatus of claim 1, wherein the biasing mechanism comprises a spring.

8. An apparatus for acoustically coupling a sensor system to a wall of a well having a deployment member positioned therein, comprising:
    a body capable of being coupled to the deployment member;
    a sensor system positioned within the body;
    at least one biasing mechanism capable of displacing the sensor system away from the deployment member and toward the wall;
    a release mechanism for actuating the biasing mechanism to displace the sensor system; and
    first and second sensor system carriers coupled to the sensor system, wherein the biasing mechanisms contact the first and second sensor system carriers to displace the sensor system, wherein the first sensor system carrier comprises one node for contacting the wall, and wherein the second sensor system carrier comprises two nodes for contacting the wall.

9. An apparatus for acoustically coupling a sensor system to a wall of a well having a deployment member positioned therein, comprising:
    a body capable of being coupled to the deployment member;
    a sensor system positioned within the body;
    at least one biasing mechanism capable of displacing the sensor system away from the deployment member and toward the wall, wherein the biasing mechanism comprises a magnet; and
    a release mechanism for actuating the biasing mechanism to displace the sensor system.

10. An apparatus for acoustically coupling a sensor system to a wall of a well having a deployment member positioned therein, comprising:
    a body capable of being coupled to the deployment member;
    a sensor system positioned within the body;
    at least one biasing mechanism capable of displacing the sensor system away from the deployment member and toward the wall; and
    a release mechanism for actuating the biasing mechanism to displace the sensor system, wherein the release mechanism comprises a dissolvable polymer.

11. The apparatus of claim 10, wherein the dissolvable polymer dissolves in fluid within the well.

12. An apparatus for acoustically coupling a sensor system to a wall of a well having a deployment member positioned therein, comprising:
    a body capable of being coupled to the deployment member;
    a sensor system positioned within the body;
    at least one biasing mechanism capable of displacing the sensor system away from the deployment member and toward the wall; and
    a release mechanism for actuating the biasing mechanism to displace the sensor system, wherein the release mechanism comprises a rupture disk.

13. The apparatus of claim 12, wherein the rupture disk is actuated by hydrostatic pressure of fluid within the well.

14. An apparatus for acoustically coupling a sensor system to a wall of a well having a deployment member positioned therein, comprising:
    a body capable of being coupled to the deployment member;
    a sensor system positioned within the body;

at least one biasing mechanism capable of displacing the sensor system away from the deployment member and toward the wall;

a release mechanism for actuating the biasing mechanism to displace the sensor system; and at least one guiding mechanism to direct the sensor system as it is deployed.

15. The apparatus of claim 14, wherein the guiding mechanism comprises a pin.

16. The apparatus of claim 15, wherein the pin is located on the body.

17. The apparatus of claim 15, wherein the pin has an elastomer disposed thereon to acoustic isolate the sensor system from the body.

18. An apparatus for acoustically coupling a sensor system to a wall of a well having a deployment member positioned therein, comprising:

a body capable of being coupled to the deployment member;

a sensor system positioned within the body, wherein the sensor system is optical based;

at least one means for displacing the sensor system away from the deployment member and toward the wall;

at least one means for guiding the sensor system as it is displaced; and a means for actuating the biasing mechanism to displace the sensor system.

19. The apparatus of claim 18, wherein the body further comprises an attachment mechanism for coupling the body to the deployment member.

20. The apparatus of claim 19 wherein the attachment mechanism comprises a clamp.

21. The apparatus of claim 18, further comprising at least one sensor system carrier coupled to the sensor system, and wherein the means for biasing contacts the sensor system carrier to displace the sensor system.

22. The apparatus of claim 21, wherein the sensor system carrier comprises at least one node for contacting the wall.

23. The apparatus of claim 21, wherein the sensor system carrier comprises a first and second component affixed around the sensor system.

24. The apparatus of claim 18, further comprising first and second sensor system carriers coupled to the sensor system, and wherein the means for biasing contacts the first and second sensor system carriers to displace the sensor system.

25. The apparatus of claim 24, wherein the first and second sensor system carriers are positioned on opposite ends of the sensor system.

26. The apparatus of claim 24, wherein the first sensor system carrier comprises one node for contacting the wall, and wherein the second sensor system carrier comprises two nodes for contacting the wall.

27. The apparatus of claim 18, wherein the means for biasing comprises a spring.

28. The apparatus of claim 18, wherein the means for biasing comprises a magnet.

29. The apparatus of claim 18, wherein the means for actuating comprises a dissolvable polymer.

30. The apparatus of claim 18, wherein the means for actuating comprises a rupture disk.

31. The apparatus of claim 18, wherein the means for guiding comprises a pin.

32. The apparatus of claim 31, wherein the pin is located on the body.

33. The apparatus of claim 31, wherein the pin has an elastomer disposed thereon to acoustic isolate the sensor system from the body.

34. An apparatus for acoustically coupling a sensor system to a wall of a well having a deployment member positioned therein, comprising:

a body capable of being coupled to the deployment member;

a sensor system positioned within the body;

at least one biasing mechanism capable of displacing the sensor system away from the deployment member and toward the wall; and at least one guiding pin interfacing with the sensor system for directing the sensor system as it is displaced.

35. The apparatus of claim 34, wherein the sensor system is fiber optic based.

36. The apparatus of claim 34, wherein the body further comprises an attachment mechanism for coupling the body to the deployment member.

37. The apparatus of claim 36, wherein the attachment mechanism comprises a clamp.

38. The apparatus of claim 34, further comprising at least one sensor system carrier coupled to the sensor system, and wherein the biasing mechanism contacts the sensor system carrier to displace the sensor system.

39. The apparatus of claim 38, wherein the sensor system carrier comprises at least one node for contacting the wall.

40. The apparatus of claim 38, wherein the sensor system carrier comprises a first and second component affixed around the sensor system.

41. The apparatus of claim 34, further comprising first and second sensor system carriers coupled to the sensor system, and wherein the biasing mechanisms contact the first and second sensor system carriers to displace the sensor system.

42. The apparatus of claim 41, wherein the first and second sensor system carriers are positioned on opposite ends of the sensor system.

43. The apparatus of claim 41, wherein the first sensor system carrier comprises one node for contacting the wall, and wherein the second sensor system carrier comprises two nodes for contacting the wall.

44. The apparatus of claim 34, wherein the biasing mechanism comprises a spring.

45. The apparatus of claim 34, wherein the biasing mechanism comprises a magnet.

46. The apparatus of claim 34, further comprising a release mechanism for actuating the biasing mechanism to displace the sensor system.

47. The apparatus of claim 46, wherein the release mechanism comprises a dissolvable polymer.

48. The apparatus of claim 46, wherein the release mechanism comprises a rupture disk.

49. The apparatus of claim 34, wherein the guiding pin is located on the body.

50. The apparatus of claim 49, further comprising a guide hole coupled with the sensor system for interfacing with the guiding pin.

51. The apparatus of claim 50, wherein the pin has an elastomer disposed thereon to acoustic isolate the sensor system from the body.

52. The apparatus of claim 34, wherein the guiding pin is substantially perpendicular to an axis of the deployment member.

* * * * *

UNITED STATES PATENT AND TRADEMARK OFFICE
CERTIFICATE OF CORRECTION

PATENT NO. : 7,124,818 B2
APPLICATION NO. : 10/678963
DATED : October 24, 2006
INVENTOR(S) : Berg et al.

Page 1 of 1

It is certified that error appears in the above-identified patent and that said Letters Patent is hereby corrected as shown below:

On the Title Page:

Item (73) Assignee, please delete "Weatherford/Lamb, Inc., Houston, TX (US)" and insert --Optoplan AS, Houston, TX (US)--.

Signed and Sealed this

Twenty-fifth Day of August, 2009

David J. Kappos
*Director of the United States Patent and Trademark Office*